US012719888B2

(12) United States Patent
Mardikar et al.

(10) Patent No.: US 12,719,888 B2
(45) Date of Patent: Aug. 25, 2026

(54) DISTRIBUTED CYBER THREAT INTELLIGENCE PLATFORM

(71) Applicant: TEACHERS INSURANCE AND ANNUITY ASSOCIATION OF AMERICA, New York, NY (US)

(72) Inventors: Upendra Mardikar, Fremont, CA (US); Christopher Pitts, Charlotte, NC (US); Ron Barthel, Marvin, NC (US); Julie Moog, Chatham, NJ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 198 days.

(21) Appl. No.: 18/643,741

(22) Filed: Apr. 23, 2024

(65) Prior Publication Data

US 2025/0330477 A1 Oct. 23, 2025

(51) Int. Cl.
*H04L 9/40* (2022.01)

(52) U.S. Cl.
CPC ................................ *H04L 63/1416* (2013.01)

(58) Field of Classification Search
CPC ............. H04L 63/1416; H04L 63/1425; H04L 63/1433
USPC ............................................................ 726/23
See application file for complete search history.

(56) References Cited

U.S. PATENT DOCUMENTS 11,621,973 B2 4/2023 Mylrea et al.
12,260,260 B1 * 3/2025 Gorman ................ G06F 9/5066
12,499,329 B2 * 12/2025 Shah ...................... G09B 5/065
2005/0216957 A1 * 9/2005 Banzhof ............. H04L 63/1433 726/25
2019/0229892 A1 * 7/2019 Jevans .................. H04L 9/3297
2020/0160320 A1 * 5/2020 Williams .............. H04L 9/0637
2020/0412766 A1 * 12/2020 Gu ........................ H04L 9/3247
2021/0152536 A1 * 5/2021 Padmanabhan ....... H04L 9/3236
2022/0103584 A1 * 3/2022 Tobin ................. H04L 63/0236

(Continued)

OTHER PUBLICATIONS

Homan et al., "A New Network Model for Cyber Threat Intelligence Sharing using Blockchain Technology," A 2019 10th IFIP International Conference on New Technologies, Mobility and Security (NTMS), pp. 1-6 (2019).

(Continued)

*Primary Examiner* — Kaylee J Huang
(74) *Attorney, Agent, or Firm* — MARSHALL, GERSTEIN & BORUN LLP

(57) ABSTRACT

Techniques are described herein for providing a distributed cyber threat intelligence platform. An example system includes a set of cyber threat intelligence content stored on a distributed ledger accessible by one or more nodes. The example system further includes an artificial intelligence (AI) engine configured to: receive a node input from a new device indicating a node type to be established for the new device, generate one or more responses to the node input, and establish a new node for the new device on the distributed ledger that corresponds to the node type. The example system further includes a smart contracts engine configured to: receive, from the new node, a second input associated with cyber threat intelligence, store the second input in the distributed ledger as part of the set of cyber threat intelligence content, and transmit the second input to the one or more nodes.

20 Claims, 13 Drawing Sheets

(56) References Cited

U.S. PATENT DOCUMENTS

| | | | | |
|---|---|---|---|---|
| 2022/0158890 | A1* | 5/2022 | Karapantelakis | H04L 41/0627 |
| 2022/0417044 | A1* | 12/2022 | Goel | G06F 11/1451 |
| 2023/0252340 | A1* | 8/2023 | Ramanathan | G06N 20/00 706/11 |
| 2023/0325814 | A1 | 10/2023 | Vijayan et al. | |
| 2023/0421578 | A1* | 12/2023 | Mullins | H04L 63/1416 |

OTHER PUBLICATIONS

Li, X., "A Blockchain-Based Verifiable User Data Access Control Policy for Secured Cloud Data Storage," Computational Intelligence and Neuroscience, vol. 2022, 12 pages (2022).

Hu, V., "Blockchain for Access Control Systems," National Institute of Standards and Technology, (2022).

"What is attribute-based access control (ABAC)?" Retrieved from the internet at: <URL:https://www.sailpoint.com/identity-library/what-is-attribute-based-access-control> (Mar. 28, 2023).

"From documentation to training to product downloads and more, get everything you need for Pint product success." Retrieved from the internet at: <URL:https://support.pingidentity.com/s/article/How-do-I-include-additional-profile-attributes-in-the-OAuth-2-0-Access-token-in-Advanced-Identity-Cloud>.

* cited by examiner

DISTRIBUTED CYBER THREAT INTELLIGENCE PLATFORM

TECHNICAL FIELD

The present disclosure relates generally to techniques for improving cyber threat intelligence. In particular, the techniques described herein relate to a distributed cyber threat intelligence platform.

BACKGROUND

The cybersecurity threat landscape is evolving at an unprecedented pace, driven by emerging technologies like artificial intelligence (AI). These advancements are not only transforming industries but also making it easier for cybercriminals to launch devastating attacks on vulnerable organizations. Without a unified source of cyber threat intelligence, individual response efforts tend to be sluggish. Further still, participants tend to lack playbooks and utilize inadequate, out-of-band conventional communication methods.

As an example, entities typically utilize a speed dial list that is manually maintained in an attempt to manage their cybersecurity efforts. Outside of direct calls, these entities may converse at quarterly meetings that are randomly hosted or by sending emails between one another over public networks. Consequently, these entities are often behind on the tactics, techniques, and procedures being actively leveraged by threat actors. Often the solutions are found in desperate tools, but this is not a reliable, much less, sustainable solution. Moreover, impacts and lessons learned from such attacks/solutions are frequently not shared across the industry(ies) due to a lack of anonymization in the sharing process.

Therefore, a need exists for a distributed cyber threat intelligence platform that enables industry entities to share carefully curated, trustworthy, and timely cyber threat intelligence within peer networks, especially when the industries are under active threat of attack.

SUMMARY

In some aspects, the techniques described herein relate to a system for providing a distributed cyber threat intelligence platform, the system including: a set of cyber threat intelligence content stored on a distributed ledger accessible by one or more nodes; an artificial intelligence (AI) engine configured to: receive a node input from a new device indicating a node type to be established for the new device, generate, by a trained AI model, one or more responses to the node input, and establish, by the trained AI model, a new node for the new device on the distributed ledger that corresponds to the node type; and a smart contracts engine configured to: receive, from the new node, a second input associated with cyber threat intelligence, store, by a first smart contract, the second input in the distributed ledger as part of the set of cyber threat intelligence content, and transmit, by a second smart contract, the second input to the one or more nodes.

In some aspects, the techniques described herein relate to a system, wherein the AI engine is further configured to: evaluate, by the trained AI model, the second input received from the new node; generate, by the trained AI model, composite cyber threat content by combining portions of the second input and one or more inputs previously stored on the distributed ledger as part of the set of cyber threat intelligence content; and disseminate the composite cyber threat content to each of the one or more nodes.

In some aspects, the techniques described herein relate to a system, wherein the trained AI model includes a large language model (LLM) trained using a plurality of training node inputs and a plurality of training distributed ledger inputs to output training responses, node types, and threat evaluations.

In some aspects, the techniques described herein relate to a system, further including a reward engine configured to: determine that a first node of the one or more nodes has satisfied a reward threshold; generate a non-fungible token (NFT) based on the reward threshold; and mint the NFT to the distributed ledger, wherein a portion of data associated with the reward threshold is linked to the NFT.

In some aspects, the techniques described herein relate to a system, wherein the reward threshold corresponds to at least one of: (i) a contribution threshold, (ii) a bug discovery threshold, or (iii) a suggestion threshold, and the reward engine is further configured to: evaluate a contribution level of the first node to determine whether the first node has satisfied the contribution threshold; evaluate a bug discovery value of the first node to determine whether the first node has satisfied the bug discovery threshold; or evaluate one or more suggestions contributed by the first node to determine whether the first node has satisfied the suggestion threshold.

In some aspects, the techniques described herein relate to a system, wherein the smart contracts engine includes at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

In some aspects, the techniques described herein relate to a system, wherein each node of the one or more nodes includes a clearance level value, and the smart contracts engine is configured to: receive, from the AI engine, an indication of a potentially compromised node of the one or more nodes; transmit a polling prompt to each node of the one or more nodes without transmitting the polling prompt to the potentially compromised node; receive a poll response from each node; and responsive to receiving the poll response from each node, isolate the potentially compromised node from participating on the distributed ledger by adjusting the clearance level value of the potentially compromised node.

In some aspects, the techniques described herein relate to a system, wherein the AI engine is further configured to: receive, from the new node, an indication of the second input associated with cyber threat intelligence; evaluate a proof-of-contribution for the new node based on the indication; and allocate an increased level of voting power to the new node, in accordance with the proof-of-contribution.

In some aspects, the techniques described herein relate to a system, wherein the first smart contract is identical to the second smart contract.

In some aspects, the techniques described herein relate to a system, wherein the set of cyber threat intelligence content includes at least one of: (i) a threat vulnerability notification, (ii) a reference architecture, (iii) a threat response procedure, (iv) a set of contacts, (v) a vendor indication, (vi) a policy configuration, (vii) an education resource, or (viii) a threat intelligence communication.

In some aspects, the techniques described herein relate to a computer-implemented method for providing a distributed cyber threat intelligence platform, the computer-implemented method including: receiving, at one or more processors executing an AI engine, a node input from a new device indicating a node type to be established for the new device on a distributed ledger; generating, by the one or more processors executing a trained AI model of the AI engine, one or more responses to the node input; establishing, by the one or more processors executing the trained AI model, a new node for the new device on the distributed ledger that corresponds to the node type; receiving, at the one or more processors executing a smart contracts engine, a second input associated with cyber threat intelligence; storing, by the one or more processors executing a first smart contract of the smart contracts engine, the second input in the distributed ledger as part of a set of cyber threat intelligence content; and transmitting, by the one or more processors executing a second smart contract of the smart contracts engine, the second input to one or more nodes having access to the distributed ledger.

In some aspects, the techniques described herein relate to a computer-implemented method, further including: evaluating, by the one or more processors executing the trained AI model, the second input received from the new node; generating, by the one or more processors executing the trained AI model, composite cyber threat content by combining portions of the second input and one or more inputs previously stored on the distributed ledger as part of the set of cyber threat intelligence content; and disseminating, by the one or more processors, the composite cyber threat content to each of the one or more nodes. Further in these aspects, disseminating the composite cyber threat content is performed anonymously.

In some aspects, the techniques described herein relate to a computer-implemented method, wherein the trained AI model includes a large language model (LLM) trained using a plurality of training node inputs and a plurality of training distributed ledger inputs to output training responses, node types, and threat evaluations.

In some aspects, the techniques described herein relate to a computer-implemented method, further including: determining, by the one or more processors executing a reward engine, that a first node of the one or more nodes has satisfied a reward threshold corresponding to at least one of: (i) a contribution threshold, (ii) a bug discovery threshold, or (iii) a suggestion threshold by: evaluating a contribution level of the first node to determine whether the first node has satisfied the contribution threshold, evaluating a bug discovery value of the first node to determine whether the first node has satisfied the bug discovery threshold, or evaluating one or more suggestions contributed by the first node to determine whether the first node has satisfied the suggestion threshold; generating, by the one or more processors executing the reward engine, a non-fungible token (NFT) based on the reward threshold; and minting, by the one or more processors executing the reward engine, the NFT to the distributed ledger, wherein a portion of data associated with the reward threshold is linked to the NFT.

In some aspects, the techniques described herein relate to a computer-implemented method, wherein the smart contracts engine includes at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

In some aspects, the techniques described herein relate to a computer-implemented method, wherein each node of the one or more nodes includes a clearance level value, and the computer-implemented method further includes: receiving, at the one or more processors executing the AI engine, an indication of a potentially compromised node of the one or more nodes; transmitting, by the one or more processors executing the smart contracts engine, a polling prompt to each node of the one or more nodes without transmitting the polling prompt to the potentially compromised node; receiving, at the one or more processors executing the smart contracts engine, a poll response from each node; and responsive to receiving the poll response from each node, isolating, by the one or more processors executing the smart contracts engine, the potentially compromised node from participating on the distributed ledger by adjusting the clearance level value of the potentially compromised node.

In some aspects, the techniques described herein relate to a computer-implemented method, further including: receiving, at the one or more processors from the new node, an indication of the second input associated with cyber threat intelligence; evaluating, by the one or more processors executing the AI engine, a proof-of-contribution for the new node based on the indication; and allocating, by the one or more processors executing the AI engine, an increased level of voting power to the new node, in accordance with the proof-of-contribution.

In some aspects, the techniques described herein relate to a computer-implemented method, wherein the first smart contract is identical to the second smart contract.

In some aspects, the techniques described herein relate to a computer-implemented method, wherein the set of cyber threat intelligence content includes at least one of: (i) a threat vulnerability notification, (ii) a reference architecture, (iii) a threat response procedure, (iv) a set of contacts, (v) a vendor indication, (vi) a policy configuration, (vii) an education resource, or (viii) a threat intelligence communication.

In some aspects, the techniques described herein relate to a tangible, non-transitory computer-readable medium storing instructions for providing a distributed cyber threat intelligence platform that, when executed by one or more processors of a computing device, cause the computing device to: receive, at an AI engine, a node input from a new device indicating a node type to be established for the new device on a distributed ledger; generate, by a trained AI model of the AI engine, one or more responses to the node input; establish, by the trained AI model, a new node for the new device on the distributed ledger that corresponds to the node type; receive, from the new node at a smart contracts engine, a second input associated with cyber threat intelligence; store, by a first smart contract of the smart contracts engine, the second input in the distributed ledger as part of a set of cyber threat intelligence content; and transmit, by a second smart contract of the smart contracts engine, the second input to one or more nodes having access to the distributed ledger.

Therefore, in accordance with the above, and with the disclosure herein, the present disclosure includes improvements in computer functionality or in improvements to other technologies at least because the present disclosure describes that, e.g., cybersecurity systems and associated devices (e.g., user computing devices, host servers, nodes, etc.), may be improved or enhanced with the disclosed distributed cyber threat intelligence platform. That is, the present disclosure describes improvements in the functioning of cybersecurity systems itself or "any other technology or technical field" (e.g., field of cybersecurity) because the disclosed platform improves and enhances the operation of user cybersecurity systems by introducing AI and/or machine learning (ML) engines/models, smart contracts engines, and reward engines/systems configured to curate and share cyber threat intelligence information to distributed nodes in real-time across a secure network using distributed ledgers and NFTs in a manner that is unachievable using conventional techniques. This improves over the prior art at least because such conventional techniques were error-prone and untimely, as they lack the ability for accurately, consistently, and quickly identifying cybersecurity threats, generating/recording/sharing cyber threat intelligence, and/or actively managing and preserving anonymity of a distributed network of platform participants.

As mentioned, the AI/ML model(s) may be trained using machine learning and may utilize machine learning during operation. Therefore, in these instances, the techniques of the present disclosure may further include improvements in computer functionality or in improvements to other technologies at least because the disclosure describes such models being trained with a plurality of training data (e.g., 10,000s of training data corresponding to the node inputs, distributed ledger inputs, input prompts, etc.) to output responses, node types, threat evaluations, and/or other outputs configured to improve the user/entity's efforts related to a cybersecurity system and associated devices.

Moreover, the present disclosure includes effecting a transformation or reduction of a particular article to a different state or thing, e.g., transforming or reducing the generation, sharing, and/or recordation of cyber threat intelligence and the deployment/implementation of effective cybersecurity measures from a non-optimal or error state to an optimal state.

Still further, the present disclosure includes specific features other than what is well-understood, routine, conventional activity in the field, or adding unconventional steps that demonstrate, in various embodiments, particular useful applications, e.g., an artificial intelligence (AI) engine configured to: receive a node input from a new device indicating a node type to be established for the new device, generate, by a trained AI model, one or more responses to the node input, and establish, by the trained AI model, a new node for the new device on the distributed ledger that corresponds to the node type; and a smart contracts engine configured to: receive, from the new node, a second input associated with cyber threat intelligence, store, by a first smart contract, the second input in the distributed ledger as part of the set of cyber threat intelligence content, and transmit, by a second smart contract, the second input to the one or more nodes, among others.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

DETAILED DESCRIPTION

Figure 1A:
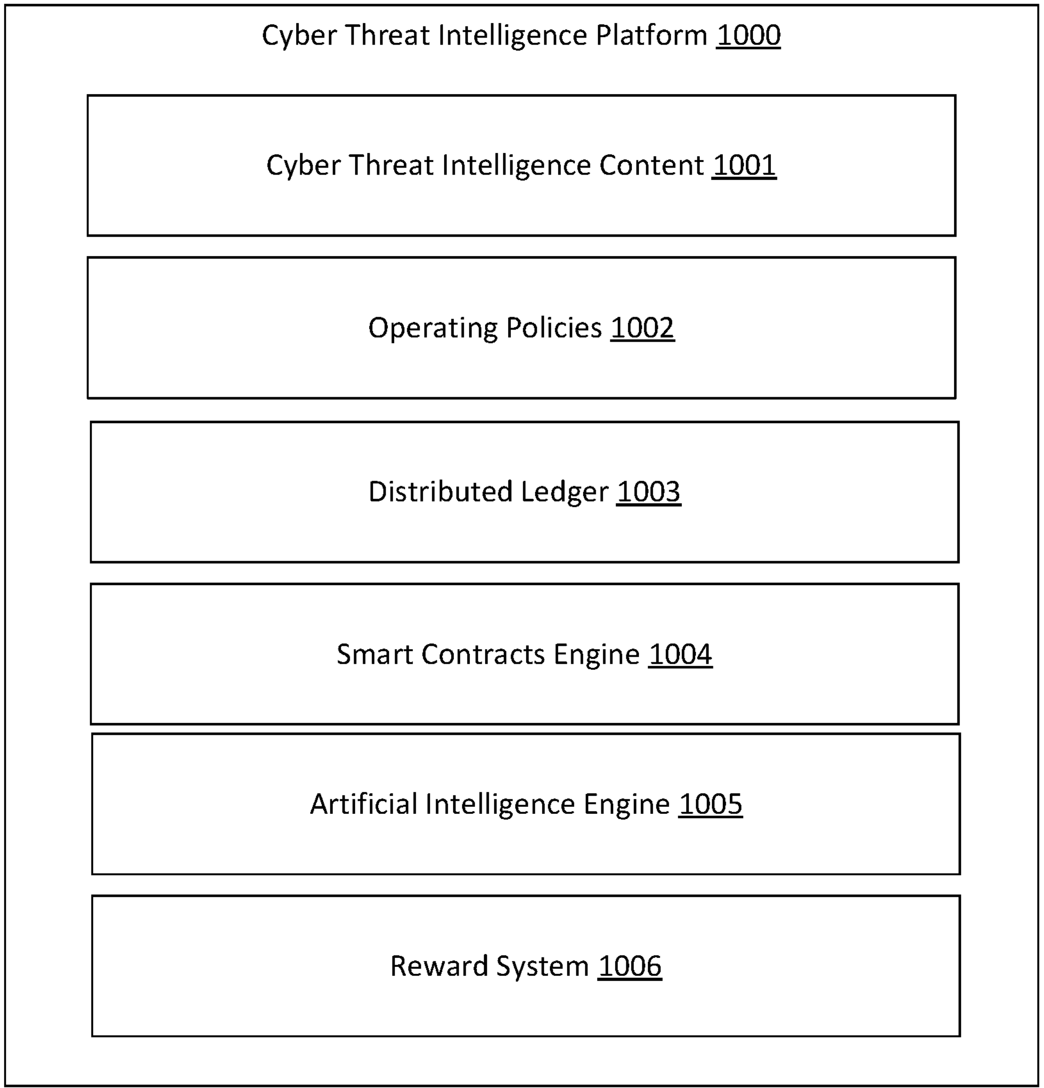
FIG. 1A is a block diagram illustrating an example cyber threat intelligence platform, in accordance with various embodiments herein.

The present disclosure relates to, inter alia, a distributed cyber threat intelligence platform that optimizes the quality of cybersecurity across various participant/entity ecosystems in a "shared responsibility" architecture that drives better outcomes to cyber impacts for such participants/entities. The theory behind such a distributed cyber threat intelligence platform is that those who contribute to the platform's success have the best intentions of the platform in mind and will provide high quality, trusted intelligence.

More specifically, the distributed cyber threat intelligence platform is a holistic cyber services platform which is a mechanism for providing "cyber in a box" services that are specifically curated to a participants' needs. The distributed cyber threat intelligence platform may then orchestrate the cyber threat intelligence content by a smart contracts engine in an automated and distributed way while trained AI performs content analysis and rewards participants, content creators, and tinkerers for their innovative mitigations and participation in the distributed cyber threat intelligence platform. Rewards may be in the form of non-fungible tokens (NFTs) that may be issued on the distributed ledger (e.g., platform blockchain).

More broadly, the distributed cyber threat intelligence platform has a foundation built upon peer-reviewed education and training for all participants. This education/training may include well-vetted reference architectures endorsed by both peers and cybersecurity industry experts that include estimates for vendor products, as well as diligent implementation and monitoring of secure configurations. As described herein, and as part of these education, training, generation, dissemination, communication, and other sharing efforts, the distributed cyber threat intelligence platform may utilize AI and distributed ledger technologies.

Distributed Ledger Technology (DLT) which enables digital systems to record the characteristics of assets (e.g., data corresponding to cybersecurity) along with transactions and operations performed on assets in which the transactions, operations, and their details are recorded in multiple places at the same time.

Unlike traditional databases, distributed ledgers have no central data store. The present disclosure relates to private ledgers, which are permissioned distributed ledger systems where a single authority or organization has write-access to the network and control over read permissions can be public or restricted if a public readability feature is included in the private ledger. Such networks may include peer networks, such as, the Fediverse, and networks between vendors, governmental entities, etc.

Of course, the systems and methods of the present disclosure may additionally, or alternatively, include public ledgers, federated ledgers, and/or any other suitable types or combinations of ledgers. For example, the present disclosure may include public ledgers, which are databases that are consensually shared and synchronized across multiple sites, institutions, or geographies. Such public ledgers are generally accessible by multiple people and systems, allow transactions to have public "witnesses," and participants at each node of the network can access the recordings shared across that network and can own identical copies of it. Any changes or additions made to the public ledger are reflected and copied to all participants. Such public ledgers are generally built in a standardized manner, such that two relatively independent public ledgers may communicate through cross-ledger interoperability. This cross-ledger implementation may be mainly represented by asset swaps and asset transfers, and through such an implementation, the limitations of a single ledger may be avoided.

Similarly, the present disclosure may include federated ledgers, which are hybrid public/private ledgers that are similar to private ledgers, but which remove the sole organization influence from the network and enable multiple entities to use the network for their benefit as a hub where the multiple organizations can simultaneously exchange information and work, thereby enabling participants to "fast forward" any kind of work requiring multiple entities to participate or approve transactions.

Furthermore, the present disclosure relates to smart contracts which are computerized transaction protocols that execute terms of a contract and can be self-executing. In effect, a smart contract has a conditional or an "if" component (i.e., the "left hand side" of a rule), and also has an executable or "then" component (i.e., called the "right hand side" of a rule), with the difference being that a smart contract "watches" a distributed ledger for its conditions to be met at which point it "fires" or executes and immutably records its actions (contract) on the distributed ledger.

Techniques, systems, apparatuses, components, devices, and methods are disclosed for utilizing a distributed ledger, or blockchain, for managing asset (e.g., cyber threat intelligence, rewards) records. For example, in an asset recordation system, a distributed ledger may be maintained by nodes. The distributed ledger architecture may include a private distributed ledger where a single authority or organization has write-access to the network, and control over read permissions can be public or restricted if a public readability feature is included in the private ledger. If such read permissions are restricted, a user attempting to view the private ledger may need to enter a username and password for authentication. For example, the private distributed ledger may obtain transaction-related documents for assets, such as cyber security threat type, author, contribution level, etc. The transaction-related documents may be dynamic and more memory intensive than the identification information and the ownership information. Moreover, the transaction-related documents may be more sensitive and private than the identification information and ownership information. Accordingly, the transaction-related documents may be managed by a single authority or organization rather than a public distributed ledger that may be accessed by any computing device In certain embodiments, the distributed ledger architecture described herein may include a public distributed ledger which is accessible by multiple people and systems, be permissionless, and may allow transactions to have public "witnesses." Participants at each node of the network can access the recordings shared across that network and can own identical copies of it. Any changes or additions made to the public distributed ledger may be reflected and copied to all participants. The public distributed ledger may also obtain identification information for assets, which may uniquely identify an asset, and may be static and immutable in the public distributed ledger.

In some embodiments, the distributed ledger architecture may also include a federated distributed ledger layer which requires nodes to receive permission to append data to the federated distributed ledger. Control over read permissions can be public or restricted if a public readability feature is included in the federated ledger. If such read permissions are restricted, a user attempting to view the federated ledger may need to enter a username and password for authentication. The federated distributed ledger may obtain ownership information for assets, such as a contributor, contribution level, etc. The ownership information may be dynamic and more memory intensive than the identification information. Moreover, the ownership information may be more sensitive and private than the identification information. Accordingly, the ownership information may be managed by the federated distributed ledger layer rather than a public distributed ledger layer that can be accessed by any computing device.

Further, the systems and methods of the present disclosure include users interacting with other users via digital tokens. For example, online digital identities, as implemented by use of digital tokens on a blockchain, may provide a single source of user authentication for a given user and reduce digital waste across networks. Such digital identities may be used in a variety of ways to identify respective users.

Namely, digital tokens may be associated with users where such digital tokens may be used to provide respective digital identities to authenticate a select group of users for the purpose transacting with, or associating users with, people or entities. Such digital tokens may provide access or privileges in either real-world or virtual environments, such as talks/presentations, conferences, trainings, video events, or in the Metaverse. In various embodiments, a user's digital token(s), and/or related public and private keys, may be used to identify and/or authenticate a user and server as a single source of authenticity and identification to a variety of entities, persons, and related systems.

Therefore, the systems and methods of the present disclosure may broadly enable a user to engage with other users through a secure distributed ledger architecture that may also connect with a user's online digital identity in an environment, such as the Metaverse. Transactions associated with a particular asset may be generated, executed, and recorded on the distributed ledger, and the transaction may then be reflected and/or otherwise represented in the virtual environment.

As mentioned, one type of distributed ledger, a blockchain, is comprised of groupings of transactions organized together into a "block," and ordered sequentially. While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

The distributed ledger described herein may rely on a combination of consensus rules/mechanisms, such as a proof-of-identity and/or a proof-of-contribution metric(s). As mentioned, the proof-of-identity metric may require participant nodes to supply identification to ensure that only approved entities may originate changes to the chain. The proof-of-contribution metric described herein may generally require a participant node to prove/validate a level of contribution to the distributed ledger (e.g., through supply of cyber threat intelligence content) when voting on matters related to the distributed ledger.

For example, a first node may have contributed a significant amount of cyber threat intelligence content, cyber bugs, fixes, cyber threat playbooks, and/or any other type of data for upload/dissemination as part of the platform. As a result, the AI models may attribute a higher level of voting power to the first node than the first node had prior to the contributions as a reward/incentive for contributing to the platform. Thus, when the AI models and/or smart contracts described herein poll and/or otherwise request votes/input from the participant nodes of the platform, the first node may provide proof of the higher level of voting power through recorded transactions on the distributed ledger validating the first node's proof-of-contribution to have more influence over the pending vote/poll.

In any event, additions to the blockchain that satisfy the consensus rules are propagated from nodes that have validated the addition to other nodes recognized by the validating node. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one embodiment, the blockchain may be viewed as a shared spreadsheet that tracks data such as the ownership of assets. In another embodiment, the validating nodes execute code contained in "smart contracts" and distributed consensus is expressed as the network nodes agreeing on the output of the executed code.

As previously mentioned, a smart contract is a computer protocol that enables the automatic execution and/or enforcement of an agreement between different parties. In particular, the smart contract may be computer code that is located at a particular address on the blockchain. In some cases, the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

As mentioned, blockchains may be deployed in a public, decentralized, and permissionless manner meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some embodiments, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some embodiments, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in an asset recordation system may be maintained by validating nodes which transmit data to remote systems using one or more public and/or private networks, such as a private enterprise network, the Internet, a cellular router, a backhaul Internet or other type backhaul connection. The validating nodes receive transactions broadcasted to the distributed ledger network by for example, user devices. The nodes then validate the broadcasted transactions. In another example, the validating nodes execute code contained in smart contracts and other devices act as "evidence oracles" which provide evidence related to contribution level, rewards, etc. to the blockchain. Oracles may be systems, devices, or entities that connect a deterministic system with a non-deterministic system or data source.

Regardless, the systems and methods of the present disclosure may rely on and/or otherwise include this distributed ledger technology to enable users (e.g., cyber threat intelligence participants) to track and record cyber threat intelligence content. As a result, participants can share, receive, manage, educate, and/or otherwise access up-to-date cyber threat intelligence content on the blockchain as a trusted, secure, and/or immutable form of record-keeping/documentation. For example, such a user may record threat vulnerability notifications, reference architectures, threat response procedures, sets of contacts, vendor indications, policy configurations, education resources, threat intelligence communications, and/or any other data related to any cyber threat intelligence content as part of an NFT and/or other digital asset recorded on the blockchain or other distributed ledger.

As part of this distributed ledger recordation of participant cyber threat intelligence data, participants can mint an NFT for each new piece of cyber threat intelligence content, rewards for intelligence content contributions, and/or other contributions to the distributed ledger. These unique NFTs may serve as additional (or single) ownership credentials that may be transferred to a buyer or other interested party and can subsequently be used as a basis for tracking all transactions involving the cyber threat intelligence content. In fact, the NFTs may be linked to and/or otherwise indicate the corresponding cyber threat intelligence content/contributions, such that, the current owner may recreate and/or otherwise access the cyber threat intelligence content and/or receive increased voting power resulting from the other user having contributed the cyber threat intelligence content.

In the following description, for the purposes of explanation, specific details are set forth in order to provide a thorough understanding of various embodiments and examples. Various embodiments may be practiced without these specific details. The figures and description are not intended to be restrictive.

Example Computing Systems and Components for Executing a Distributed Cyber Threat Intelligence Platform FIG. 1A is a block diagram illustrating an example cyber threat intelligence platform 1000, in accordance with various embodiments herein. Broadly speaking, the cyber threat intelligence platform 1000 may be or include a set of instructions, cyber threat intelligence content, rewards (e.g., NFTs), and/or other data hosted on a centralized and/or distributed architecture (e.g., cloud-based server, centralized server) that is accessible by participant nodes (i.e., authorized user computing devices). The cyber threat intelligence platform 1000 may be connected to and/or otherwise have access to a private distributed ledger, where the cyber threat intelligence content, rewards, participant node proofs-of-contribution, voting records, and/or any other suitable data may be recorded, referenced, and/or otherwise immutably memorialized for sharing with other participant nodes.

A first layer of the cyber threat intelligence platform 1000 may be a set of created, aggregated, and/or otherwise curated cyber threat intelligence content 1001. This cyber threat intelligence content 1001 may generally be or include vulnerability notifications, reference architectures, response procedures, contact lists, vendor assessments, policy configurations, education programs/resources, training links, threat intelligence and alert communications, and/or any other suitable data. Participant nodes may have access to some/all of this cyber threat intelligence content 1001 when the participant nodes are onboarded to the platform 1000.

To facilitate this level of information sharing from the cyber threat intelligence content 1001, for example, at a traffic light protocol (TLP) amber, a trained AI model from the AI engine 1005 may identify and offer assistance with onboarding participant nodes to appropriate information sharing authorities (e.g., Financial Services Information Sharing and Analysis Center (FS-ISAC), etc.) at the time the participant node is established. The level of detail and/or access a participant node retains to the cyber threat intelligence content 1001 may be directly correlated to the type of node the participant elects to deploy at onboarding configuration with the AI model. For example, a full node deployed for the participant may retain a copy of the entire distributed ledger and the associated transactions, while a partial node may only retain a few prior months of content, and a light node may only retain what is immediately needed to function with the distributed ledger.

Regardless, as participants publish content to the cyber threat intelligence content 1001 of the platform 1000, this content may be analyzed by a trained AI model, merged with other content in the cyber threat intelligence content 1001 and broadcast to a participant list as needed. Further, as participants access or engage with the content 1001, the platform 1000 may track/identify content that is found to be particularly useful. Namely, a trained AI model from the AI engine 1005 or executed smart contracts of the smart contracts engine 1004 may indicate that a first piece of content 1001 has been watched, read, viewed, shared, employed, and/or otherwise utilized by numerous participant nodes, and the reward system 1006 may reward the creators and publishers of such content with an NFT and/or other rewards.

A second layer of the cyber threat intelligence platform 1000 may be operating policies 1002 comprising directives, legal regulations, policies, and/or other constraints that the platform 1000 and corresponding layers must adhere to in order to perform various actions within the network of participant nodes and/or a corresponding industry of such participants. For example, the operating policies 1002 may include a document or other indication representing the Undersecretary of the Department of Education's 2016 recommendation to implement NIST SP 800-171 "Protecting controlled unclassified information in nonfederal systems and organizations". This publication may include provisions regarding access control, media protection, system and information integrity processes, and/or other provisions that the platform 1000 and corresponding layers may abide by when performing actions on behalf of participant nodes. Accordingly, the operating policies 1002 may also include instructions indicating how the platform 1000 should/must implement desired access controls, media protection, and system and information integrity that may/can be facilitated by a NIST SP 800-162 attribute based access control methodology (ABAC) and an authorization protocol. An example ABAC is discussed further herein, in reference to FIG. 4A.

A third layer of the cyber threat intelligence platform 1000 may be the distributed ledger 1003. As mentioned, this distributed ledger 1003 may be a private blockchain with unique block attributes. For example, each block on the distributed ledger 1003 may include a block header that contains metadata about the block which includes a timestamp, a unique block identifier, a reference to the previous block, a reference to the node from which the broadcast originated, a node risk score, a clearance level, and/or an authentication flag. Further, the block metadata may also include information about the on-chain transaction, such as content type and the action taken on the content. These features will be discussed further herein, in reference to FIG. 4B.

The distributed ledger 1003 may leverage a variety of consensus mechanisms, such as proof-of-identity, proof-of-contribution, proof-of-stake, and/or any other suitable consensus mechanisms or combinations thereof. For example, the distributed ledger 1003 may use a proof-of-stake consensus mechanism to offer a validation opportunity for every transaction on the distributed ledger 1003. Storing transactions in this manner may build trust for participants and further incentivize them to utilize the platform 1000, as it will be accessible, immutable, and auditable by any participant node on the platform 1000. The node interface, facilitated by a trained AI model of the AI engine 1005 may configure the node type as chosen by the participant at deployment onboarding. Thus, the AI engine 1005 may expedite and simplify the setup and configuration of the platform 1000 to enable participants to quickly access and/or upload data to the distributed ledger 1003.

Broadly speaking, the proof-of-contribution mechanism may enable participants to the distributed ledger 1003 and, more broadly, the cyber threat intelligence platform 1000 to increase their voting power on the platform 1000. To illustrate, various participants having nodes authorized to access the distributed ledger 1003 may contribute cyber threat intelligence/content, such as by uploading data (e.g., indicating real-time/current attacks from an IP address, incident response playbooks to respond to a vulnerability or active attack, etc.). Based on how much an individual node contributes, the more voting power that node may receive.

More specifically, the total voting power allocated across the platform 1000 may have a static cap, from which each participant node is allocated a portion/percentage. Namely, the total voting power on the cyber threat intelligence platform 100 may always equate to 100% and each participant node may have an allocated percentage of that total percentage based on their various contributions (e.g., IR/threat playbooks, other threat content, processing/storage power, process inputs, etc.).

As an example, a first participant node and a second participant node have 30% and 70% of the voting power on the platform, respectively. The first participant node then contributes intelligence content that is worth 5% of the voting power. The platform 1000 may consequently decrease the second participant node's voting power from 70% to 65% and increase the first participant node's voting power to 35%. In general, such a voting power distribution/allocation method incentivizes a strong ecosystem for participant nodes to contribute to the platform. More particularly, the platform 1000 may more heavily weigh new/recent contributions to ensure that content and services are frequently updated. Of course, as mentioned herein, voting power allocation will also consider overall usage of each contribution by the participant nodes to allocate voting power further based on quality of each contribution.

In any event, the platform 1000 may evaluate how much of a contribution an individual node made in a variety of manners. For example, a first node may contribute an incident response plan/playbook that includes five megabytes (MB) of data. The platform 1000 (e.g., via the AI engine 1005) may analyze the incident response plan, determine a valuation of the incident response plan based on the five MB of data, and may attribute/allocate an increased level of voting power to the first node based on the valuation. Additionally, or alternatively, the AI engine 1005 may determine a valuation of contributed content based on a file size of the input, a recency of a cyber threat indicated by the input, a threat value associated with the cyber threat, a node voting value, a processing power value of the input, a storage value of the input, a smart contract contribution value, an AI model contribution value, an input process value and/or any other metric(s) or combinations thereof.

For example, a contribution from a second node that indicates a brand-new vulnerability may result in the second node receiving a substantial increase to their voting power. As another example, a third node may contribute a significant amount of computing power to the distributed ledger 1003 and/or governance idea submissions related to the distributed ledger 1003 and may corresponding receive an increase to their voting power. It should be appreciated that the valuation and corresponding voting power allocations provided to a particular node may be primarily mediated by a trained AI/ML model of the AI engine 1005. Further, once a particular node has received increased voting power from the AI engine 1005, that node may have those permissions and/or increased voting power allocations reduced by other nodes/participants through the consensus/voting mechanisms described herein. Of course, the total voting power allocated to all participant nodes may have a total point value or percentage, from which all participant nodes receive a portion, as described herein.

Moreover, the valuation determined by the platform 1000 may influence the amount of voting power and/or access level a particular node may have for the content stored as part of the platform 1000. Practically speaking, the proof-of-contribution mechanism may enable nodes/participants to increase their voting power in proportion to the quantity and quality of their contributions to the platform 1000. In other words, the more contributions an individual participant/node provides, the more power that individual participant/node may have regarding voting for changes to protocol and/or other rules of the chain. In certain embodiments, the platform participants will receive greater increases to voting power in response to providing high quality contributions (e.g., well-received policies, threat playbooks, intelligence, computing/storage power) than in response to providing a large volume of contributions (e.g., 20 MB of data that no other participant accesses or otherwise interacts with).

A fourth layer of the cyber threat intelligence platform 1000 may be a smart contracts engine 1004 that includes uniquely customized smart contracts to facilitate some/all of the cybersecurity functions described herein. For example, some smart contracts mediated by the smart contracts engine 1004 may ensure transparent auditable platform participation. Further, the smart contracts engine 1004 may include smart contracts configured to empower automated maintenance of, e.g., a participant contact and escalation list, perform a broadcast mechanism to communicate in an anonymous or an announced way, and/or rank industry cyber product evaluations at scale. In some embodiments, the smart contracts engine may include an asset control contract, a content orchestration contract, a compromise contract, a contact and escalation contract, a broadcast contract, a clearance level contract, a contribution and voting score assignment contract, a contact maintenance contract, an SIEM logging integration contract, a network security and operational monitoring contract, an AI governance and enforcement contract, and/or any other suitable type or combination(s) of smart contracts.

The smart contracts engine 1004 may also be responsible for various other functions as well. For example, the smart contracts engine 1004 may utilize and/or evaluate the consensus mechanism(s) within the cyber threat intelligence platform 1000 to sign validated cyber tools to further increase the trust of participants within the platform 1000 and the supporting components. The smart contracts engine 1004 may also collect, store, and/or disseminate peer reviewed or created standards, procedures, reference architectures, threat playbooks, threat intelligence, education links, vendor product reviews, and/or any other data uploaded and/or otherwise accessible by/on the cyber threat intelligence platform 1000.

Moreover, the smart contracts engine 1004 may be the sole method on the cyber threat intelligence platform 1000 for accessing on and off-chain data structures. Some content may be too large or change too often to maintain solely on the distributed ledger 1003. Thus, the smart contracts engine 1004, the AI engine 1005, and/or other components of the cyber threat intelligence platform 1000 may determine a content storage strategy based on the published content to the distributed ledger 1003 and the code within the smart contracts of the smart contracts engine 1004. The smart contract engine 1004 may also conduct all content orchestration outside of content on the cyber threat intelligence platform 1000 that is auto generated by the AI engine 1005, as discussed herein.

In certain embodiments, the off-chain data structures include external SIEM locations (e.g., Splunk) and/or other external cyber logging tools. Further in these embodiments, the cyber threat intelligence platform 1000 may store and/or transmit content, data, and/or other information to such off-chain structures, such as alerts for transmission to the external SIEMs for participant nodes. These alert transmissions may enable such participants to add a threat feed from the cyber threat intelligence platform 1000 in a manner that complies with their respective alert response procedures (e.g., as stored on the platform 1000)

More specifically, in certain embodiments, the smart contracts engine 1004 may actively determine a storage location for inputs based on characteristics of the input. The smart contracts engine 1004 may analyze a file size of the input, an update frequency of the input, and/or any other suitable characteristic(s) corresponding to the inputs or combinations thereof. Responsive to determining that the file size of the input fails to satisfy a file size threshold or that the update frequency of the input fails to satisfy an update frequency threshold, the smart contracts engine 1004 may determine the storage location for at least a portion of the input to be a first storage location that is separate from the distributed ledger 1003.

As an example, a first node may upload an input with a first file size of 10 MB and this input may be updated every 10 minutes. The smart contracts engine 1004 may execute a smart contract configured to evaluate the input and compare the first file size to a size threshold and the update frequency to an update frequency threshold. In this example the file size threshold may be 15 MB, and the update frequency threshold may be one update per day (i.e., one update per 24 hours). Thus, the smart contracts engine 1004 may determine that the input from the first node satisfies the file size threshold, but fails to satisfy the update frequency threshold. Accordingly, the smart contracts engine 1004 may determine that the input from the first node should be stored in an alternative location that is different from the distributed ledger 1003.

In certain embodiments, the update frequency for a particular input may be provided by the submitting node/participant, and/or may be determined independently by the smart contracts engine 1004 based on a sequence of receipts of the input corresponding to a similar file type or concept. Continuing the prior example, the smart contracts engine 1004 may determine the update frequency of the input from the first node based on a prior receipt of input from the first node (or other nodes) associated with the same cyber threat intelligence 10 minutes prior to the current upload of the 10 MB input. In this manner, the smart contracts engine 1004 may shift a content storage strategy for content when the update frequency threshold transitions from being satisfied at a first time to being unsatisfied at a second time (i.e., when the content becomes updated too often when it initially was not updated too often).

As mentioned, the smart contracts engine 1004 may manage/govern the AI engine 1005. For example, the AI governance and enforcement smart contract may revoke bad, corrupt, and/or accidental LLMs from being used by the AI engine 1005, and may thereby help avoid issues stemming from such arrant LLMs and/or other AI models.

Furthermore, when coupled with ABAC or other similar authorization protocol(s) to the distributed ledger 1003, the smart contracts engine 1004 may be utilized in a reliable, repeatable manner that generates trust within the platform 1000 because content processes may operate consistently. As mentioned, each smart contract may perform a specific function. The functions invoked for a particular request may be based on the attributes of the node publishing the request to an access control contract for authorization to access/utilize downstream smart contracts engine 1004 functions.

As an example of particular smart contracts executing from the smart contracts engine 1004, the cyber threat intelligence platform 1000 may implement a risk score and clearance level attribute for each participant node. These attributes may be populated for each node through voting by other nodes. In particular, these clearance level attributes and/or risk scores may be any suitable values configured to indicate a level of clearance/access/risk that an individual node has with respect to the cyber threat intelligence platform 1000, and more specifically, to the distributed ledger 1003. The smart contracts engine 1004 may include one or more smart contracts configured to perform a consensus-based approach to node isolation due to an increased or otherwise unsatisfactory risk score and/or clearance level attribute.

Any node that has identified another node as acting suspiciously or lists the suspicious node in a compromise report may cast a vote to isolate the suspicious nodes' participation or raise the suspicious nodes' risk score in cyber threat intelligence platform 1000 by calling the compromise assessment smart contract from the smart contracts engine 1004. This compromise assessment smart contract may then facilitate a vote from all other participating nodes to perform the isolation action by setting the clearance level attribute to 0. If a voting node does not respond within 24 hours, the compromise assessment smart contract may default the non-responsive node's vote to "no" unless a previous vote request had been received and not responded to within a prior timeframe (e.g., prior 72 hours). Once all votes are cast, the compromise assessment smart contract may adjust the clearance attribute for the suspicious node and thereby prevent its access to the larger distributed ledger 1003. Additionally, the compromise assessment smart contract may transmit a status broadcast message to all participant nodes to complete the isolation transaction. By utilizing this process, and other similar processes, the smart contracts engine 1004 may maintain adequate enforcement of regulations, policies, controls, and contracts across the entirety of the participant nodes to the distributed ledger 1003 in a communal manner.

A fifth layer of the cyber threat intelligence platform 1000 is an AI engine 1005. The AI engine 1005 may be or include instructions comprising one or more AI/ML models and/or instructions configured to train an AI/ML using any suitable AI/ML technique(s) to perform one or more of the functions described herein associated with the cyber threat intelligence platform 1000. Generally speaking, ML techniques have been developed that allow parametric or nonparametric statistical analysis of large quantities of data. Such ML techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, such as variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Example ML programs/algorithms that may be utilized by the AI engine 1005 to train any suitable AI/ML model(s) may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination. More specifically, in certain embodiments, the trained AI/ML models of the AI engine 1005 may include a large language model (LLM) trained using a plurality of training node inputs and a plurality of training distributed ledger inputs to output training responses, node types, and threat evaluations.

After training, ML programs (or information generated by such ML programs) may be used to evaluate additional data. Such data may be and/or may be related to memory data of particular memories that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the AI engine 1005 may be used to output new node types, establish new nodes, generate cyber threat content, output responses and threat evaluations, evaluate consensus mechanisms, allocate voting power, generate/mint NFTs, and/or other suitable values/functions or combinations thereof, using artificial intelligence (e.g., an AI/ML model of the AI engine 1005) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

As an example, a first participant may contributes an incident response plan that includes a series of steps, protocols, contacts, and/or other information that may help other participants avoid, resolve, and/or mitigate the impacts from a particular vulnerability and/or multiple vulnerabilities/cyber threats. More broadly, such incident response plans may include instructions for generally responding to cyber threats and/or vulnerabilities and/or may include instructions for responding to a specific cyber threat/vulnerability. In any event, and in response to receiving the incident response plan, the AI engine 1005 (via a trained AI/ML model) may automatically anonymize the incident response plan and feed this data into an LLM to train the LLM to generate a "best" incident response plan. When the LLM is adequately trained, the AI engine 1005 may thereafter receive an input prompt from a participant requesting "can you generate the latest incident response plan for me?", and the LLM may output a response prompt that includes a link to and/or a text version of the best incident response plan to the participant. Moreover, the input prompt may include more specific requests that the LLM is capable of handling. For example, the input prompt from a participant may indicate "can you generate the latest incident response plan for employees in the USA, Brazil, and Great Britain?", and the LLM may then automatically generate an optimal incident response plan for each of the identified regions.

Accordingly, the AI engine 1005 of the present disclosure may aggregate dispersed incident response plans/playbooks into a unified best practice, industry-wide response plan/playbook(s) that all participants may use. Of course, this content aggregation and generation is not confined to incident response plans/playbooks. Simply put, the AI engine 1005 may aggregate, pre-analyze, regression test, and auto disseminate curated cyber threat intelligence/content for all participants of the cyber threat intelligence platform 1000 while also recommending best practice responses, training, education, etc. based on unified response plans/playbooks, training materials, educational references, etc., that the AI engine 1005 has developed.

In certain instances, the platform 1000 may receive a new input containing updated and/or otherwise additional cyber threat intelligence content that may require updating the best practice/unified content. For example, the new input may include an updated contact, an updated vulnerability response workflow, an updated vulnerability listing, and/or any other suitable updated information. In response to this new input, the AI engine 1005 may evaluate the new input received from a node (e.g., a new node) and generate composite cyber threat content by combining portions of the new input and one or more inputs previously stored on the distributed ledger 1003 as part of the set of cyber threat intelligence content. The AI engine 1005 may thereafter disseminate the composite cyber threat content to each participant node.

As part of this cyber threat intelligence/content generation, the AI engine 1005 may evaluate the relevance of cyber threat content received and/or stored on the platform 1000. Specifically, the AI engine 1005 may evaluate each cyber threat intelligence content objects (i.e., cyber threat intelligence/content) to: determine respective relevance values corresponding to each object and generate a curated set of cyber threat intelligence content objects based on the respective relevance values and a recommended cyber threat practice. The curated cyber threat intelligence content objects may include content from the platform 1000 based on whether the relevance values of the individual content objects satisfy a relevance threshold relative to the new input(s).

Thus, the AI engine 1005 may evaluate each content object and/or input(s) to determine content objects stored on the distributed ledger 1003 that satisfy the relevance threshold relative to the new cyber threat intelligence content object (i.e., new input(s)). The relevance values and the relevance threshold may generally correspond to linguistic/textual similarities between the new inputs and the stored content objects, and/or may be or include derived characteristic similarities of any suitable type or quality. In any event, the AI engine 1005 may then generate a composite cyber threat content object by combining portions of the input(s) and the content objects stored on the distributed ledger 1003.

The AI engine 1005 may also be able to generate additional content beyond the composite content objects described herein. For example, a participant may provide the input prompt "[c]an you generate code for encrypting passwords?", and the AI engine 1005 may analyze some/all of the code that has been contributed to the platform 1000 and generate the code necessary to encrypt passwords, in accordance with the operating policies 1002 and/or other data stored as part of the cyber threat intelligence platform 1000.

Moreover, in certain embodiments, the AI engine 1005 may utilize and/or train AI/ML models leveraging retrieval augmented generation (RAG) techniques. Continuing the prior example, the participant may provide the input prompt requesting encryption code, and the AI engine 1005 may utilize a RAG model to access the Internet and/or other publicly available resources to retrieve the requested code and deliver the code in a response prompt to the participant. Additionally, or alternatively, the RAG model may utilize the code retrieved from the Internet as input data to generate the requested encryption code.

Thus, in some embodiments, trained AI model(s) of the AI engine 1005 may include a RAG model. These RAG models may be configured to identify cyber threat intelligence content objects by retrieving data from the distributed ledger 1003 and/or a source external to the distributed ledger 1003.

As another example, the AI engine 1005 may include a trained AI model configured to greet and begin the onboarding process with every participant of the cyber threat intelligence platform 1000 via a web interface. This trained AI model may help the participant determine the best node type for their needs by providing outputs explaining the benefits and downsides of light, partial, and full nodes. As a result, the trained AI model may simplify the understanding needed to establish a distributed ledger node for those that may not understand the technology. As participants continue to onboard, the trained AI model may provide/generate outputs in natural language discussing the benefits of participating in cyber threat intelligence platform 1000 by explaining the content the participant may immediately access and how the participant can obtain deeper insights by publishing their own content to the platform 1000. The trained AI model may also generate outputs indicating that the AI engine 1005 may analyze, generate, merge, and/or otherwise interact with the participant's submitted content and other participant content to generate a unified industry cyber security approach. For example, the trained AI model may generate outputs explaining how the AI engine 1005 monitors platform 1000 activity to detect potential node compromise, maligned transactions, and/or published content.

Moreover, the integrity of the distributed ledger 1003 may be managed by the AI engine 1005. Specifically, the AI engine 1005 may be the sole arbiter of block conflict resolution, outside of the consensus mechanisms described herein, and may utilize a combination of timestamps from various nodes and block nonces to correlate block positioning. For example, in certain embodiments, the AI engine 1005 may identify a block conflict associated with the distributed ledger 1003. In this example, the AI engine 1005 may also analyze timestamps corresponding with nodes having access to the distributed ledger 1003, block nonces of blocks on the distributed ledger 1003, and/or any other suitable data corresponding to the nodes having access to and/or the blocks stored on the distributed ledger 1003. The AI engine 1005 may also determine a correlated block position to resolve the block conflict.

In certain embodiments, the AI engine 1005 may also generate outputs and/or otherwise indicate how participants can/should interface with the smart contracts engine 1004 on the distributed ledger 1003. Further, in some embodiments, the AI engine 1005 may also facilitate the presentation of certain necessary/required legal stances (e.g., non-disclosure agreements (NDAs)) and may collect, store, and provide at request digitally signed NDAs from all participants. Thus, the AI engine 1005 may help provide the framework for expected confidentiality behaviors and inform participant nodes regarding recourse in the event of deviations from the provided agreements.

In addition to onboarding, the AI engine 1005 may perform content analysis on aggregated industry specific cyber threat intelligence content, reference architectures, standards, incident response playbooks, and/or any other data uploaded to and/or otherwise accessible from the cyber threat intelligence platform 1000. Based on this content analysis, the AI engine 1005 may automatically enroll participants into identified and selected memberships (e.g., Information Sharing and Analysis Center (ISAC)).

In certain embodiments, certain content may be restricted for non-members, and the AI engine 1005 may not permit every participant to have access to such content until the AI engine 1005 validates a participant has obtained the necessary program acceptance or is already a member. Upon verifying that the participant has the necessary membership/authorization, the AI engine 1005 may award the participant with a content review status that provides them access to the restricted content (e.g., TLP Amber cyber or fraud threat intelligence).

Participants may also query the AI engine 1005 for any suitable purpose to receive responses/updates from the trained models of the AI engine 1005. For example, a participant may query the AI engine 1005 on their content access status at any time. As another example, a participant may ask a trained AI model from the AI engine 1005 audit questions that may be immediately answered about published or accessed content from their respective nodes.

The AI engine 1005 may also perform certain other functions that do not involve participant on-boarding or conversing solely with individual participants. For example, the AI engine 1005 may perform vendor viability and risk analysis on published vendor review content to provide initial risk analysis concerns to participants and thereby provide product reviews directly to the platform.

As another example, the AI engine 1005 may automatically manage contact lists of entities that participants may want to contact in the event of a cyber threat and/or to proactively mitigate the effects of such cyber threats and vulnerabilities. The AI engine 1005 may update these contact lists and broadcast messages to participants when the contact lists change. Namely, the platform 1000 may receive, from a node having access to the distributed ledger 1003, an update to a set of contacts stored on the distributed ledger 1003. The AI engine 1005 may then determine an estimated adjustment to the set of contacts based on the update and broadcast the estimated adjustment to each node having access to the distributed ledger 1003. As part of this broadcast, the AI engine 1005 may poll and/or otherwise request feedback from each connected node regarding the accuracy and/or validity of the estimated adjustment(s). Responsive to receiving a consensus regarding the estimated adjustment, the AI engine 1005 may update the set of contacts based on the estimated adjustment and broadcast an updated set of contacts indication to each node having access to the distributed ledger 1003.

A sixth layer of the cyber threat intelligence platform 1000 may be the reward system 1006. Platform 1000 participants may be rewarded with NFTs and/or other suitable rewards for contributions made to the platform 1000 that satisfy a reward threshold related to an impact the contributions have regarding the shared protection of the industry. In certain embodiments, the rewards threshold may be or include a contribution threshold, a bug discovery threshold, and/or a suggestion threshold. In some embodiments, the NFTs rewarded to the participant nodes include links to and/or otherwise reference image/video files (e.g., .gif, .png files), audio files, and/or other suitable media files or combinations thereof.

For example, a first participant may provide content that establishes the existence and a solution/work-around related to a new cybersecurity bug. The reward system 1006 may evaluate the content, determine that the bug discovery value of the content satisfies the bug discovery threshold (e.g., the bug indicated in the content is, in fact, new; and/or the solution/work-around to the bug is, in fact, new), and may therefore determine that the reward threshold is satisfied. Accordingly, the reward system 1006 may generate an NFT based on the reward threshold, and corresponding to the content, and mint the NFT to the distributed ledger 1003. Further in this example, a portion of data associated with the reward threshold may be linked to the NFT, such as information about the new bug and/or the new solution/work-around for the bug.

As part of the reward system 1006, the AI engine 1005 may be queried for current industry participation leaders which may anonymously reflect the strength of those participants' programs. The reward system 1006 may thereby function as a gamification system within the cyber threat intelligence platform 1000 that may further incentivize participation and contributions to the cyber threat intelligence/content and may be touted by participants and/or exchanged for AI generated content from the AI engine 1005.

Figure 1B:
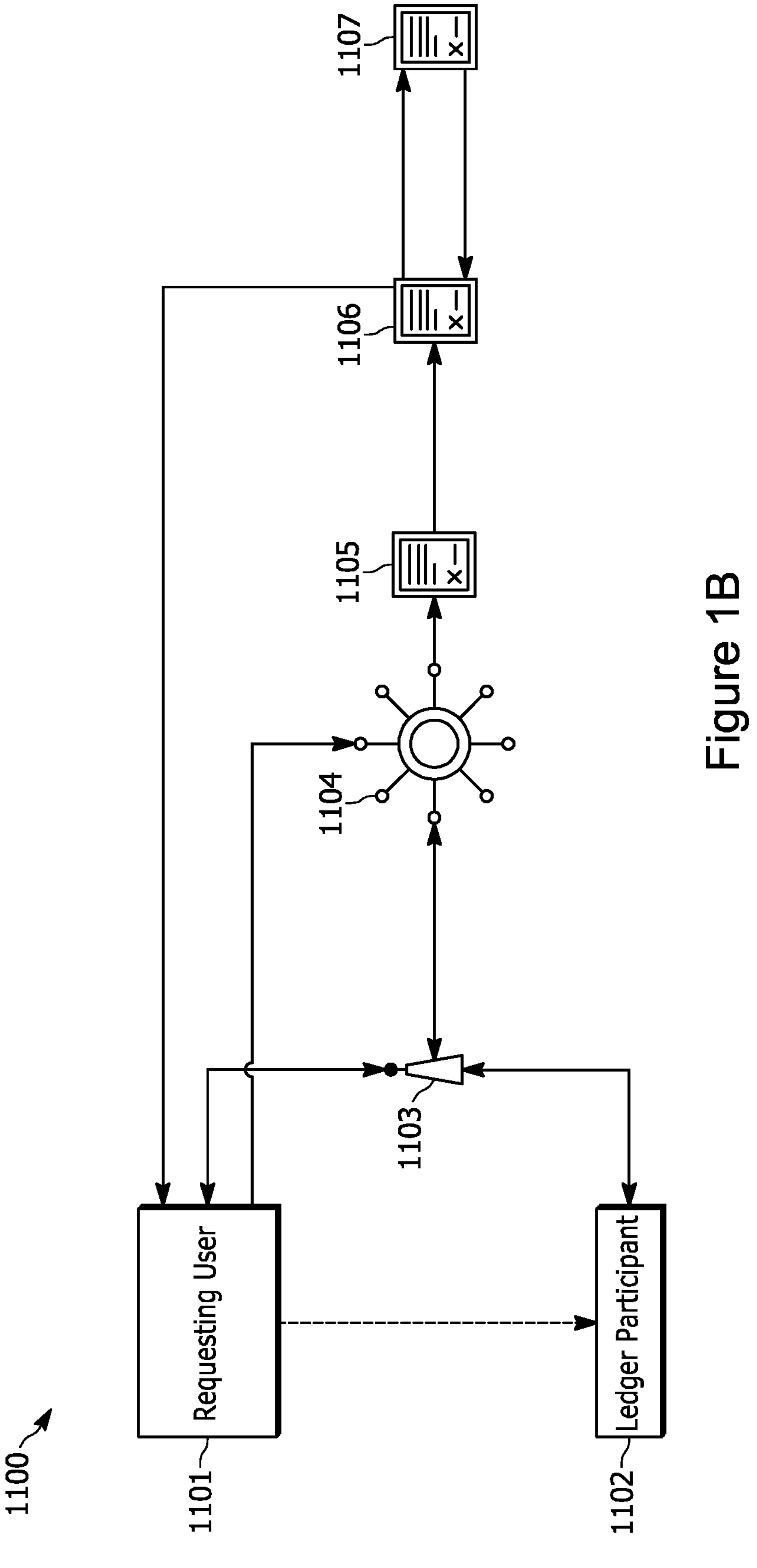
FIG. 1B illustrates an example node creation/registration architecture to join and participate as part of the cyber threat intelligence platform of FIG. 1A, in accordance with various embodiments herein.

FIG. 1B illustrates an example node creation/registration architecture 1100 to join and participate as part of the cyber threat intelligence platform 1000 of FIG. 1A, in accordance with various embodiments herein. Generally speaking, the node creation/registration architecture 1100 corresponds to a requesting user 1101 attempting to gain access to the cyber threat intelligence platform 1000 by interacting with a ledger participant 1102 and/or directly through a public network access point 1103.

In particular, the requesting user 1101 may transmit a request to join the cyber threat intelligence platform 1000 to the ledger participant 1102. The ledger participant 1102 may be a node that is already connected to and participating as part of the cyber threat intelligence platform 1000. If the ledger participant 1102 approves of the requesting user 1101 joining the platform 1000, the participant 1102 may forward this request to join the cyber threat intelligence platform 1000 to the public network access point 1103. The public network access point 1103 may thereafter transmit a request for a new node to the distributed ledger access point 1104, which may evaluate the proof-of-identity consensus mechanism for the requesting user 1101 and/or other users (e.g., ledger participant 1102).

If the proof-of-identity consensus mechanism is satisfied, the requesting user 1101 may transmit a validated quick response (QR) code to the distributed ledger access point 1104, which may forward and/or otherwise evaluate the new node request and QR code using the access chain smart contract 1105. The access chain smart contract 1105 may evaluate the request and determine that there is no node associated with the requesting device (e.g., requesting user 1101). Thus, the access chain smart contract 1105 may invoke the establish new node smart contract 1106 to establish a new node for the requesting user 1101. The establish new node smart contract 1106 may transmit the QR code to a QR code validation smart contract 1107. The QR code validation smart contract 1107 may thereafter return a validated QR code invitation corresponding to the node identification of the requesting user 1101.

With the validated QR code invitation, the establish new node smart contract 1106 may create an initial identification corresponding to the requesting user 1101. The establish new node smart contract 1106 may transmit this ID to the requesting user 1101, which may transmit device attributes required to establish a new node that can be validated as part of the proof-of-identity consensus mechanism. In any event, when the requesting user 1101 is validated to participate as part of the distributed ledger 1003, the requesting user 1101 may be allocated a trial light node, which may have reduced/limited voting rights and/or content access on the cyber threat intelligence platform 1000.

As the requesting user 1101 continues to participate as part of the cyber threat intelligence platform 1000 and contribute cyber threat intelligence/content to the platform 1000, the requesting user 1101 may be allocated more rights. For example, the requesting user 1101 may provide/upload cyber threat intelligence/content, and the public network access point 1103, distributed ledger access point 1104, and/or any suitable smart contracts may evaluate the contributions of the requesting user 1101. Based on the contribution level and/or otherwise value of the requesting user's 1101 contributions to the cyber threat intelligence platform 1000, the various components 1103, 1104, and/or smart contracts may upgrade the requesting user 1101 by, for example, allocating the requesting user 1101 a full node and/or otherwise increasing the voting power of the requesting user 1101 on voting matters within the platform 1000.

While referenced herein as various access points 1103, 1104 and/or smart contracts 1105-1107 performing various actions, this is for the purposes of discussion only. It should be appreciated that these actions may be performed by processors executing on and/or by the access points 1103, 1104, executing the various smart contracts 1105-1107, and/or executing various other components or engines of the cyber threat intelligence platform 1000. For example, the actions described herein in reference to the node creation/registration architecture 1100 may be performed by processors executing smart contracts of the smart contracts engine 1004, AI/ML models of the AI engine 1005, and/or any other components described herein or combinations thereof.

Figure 1C:
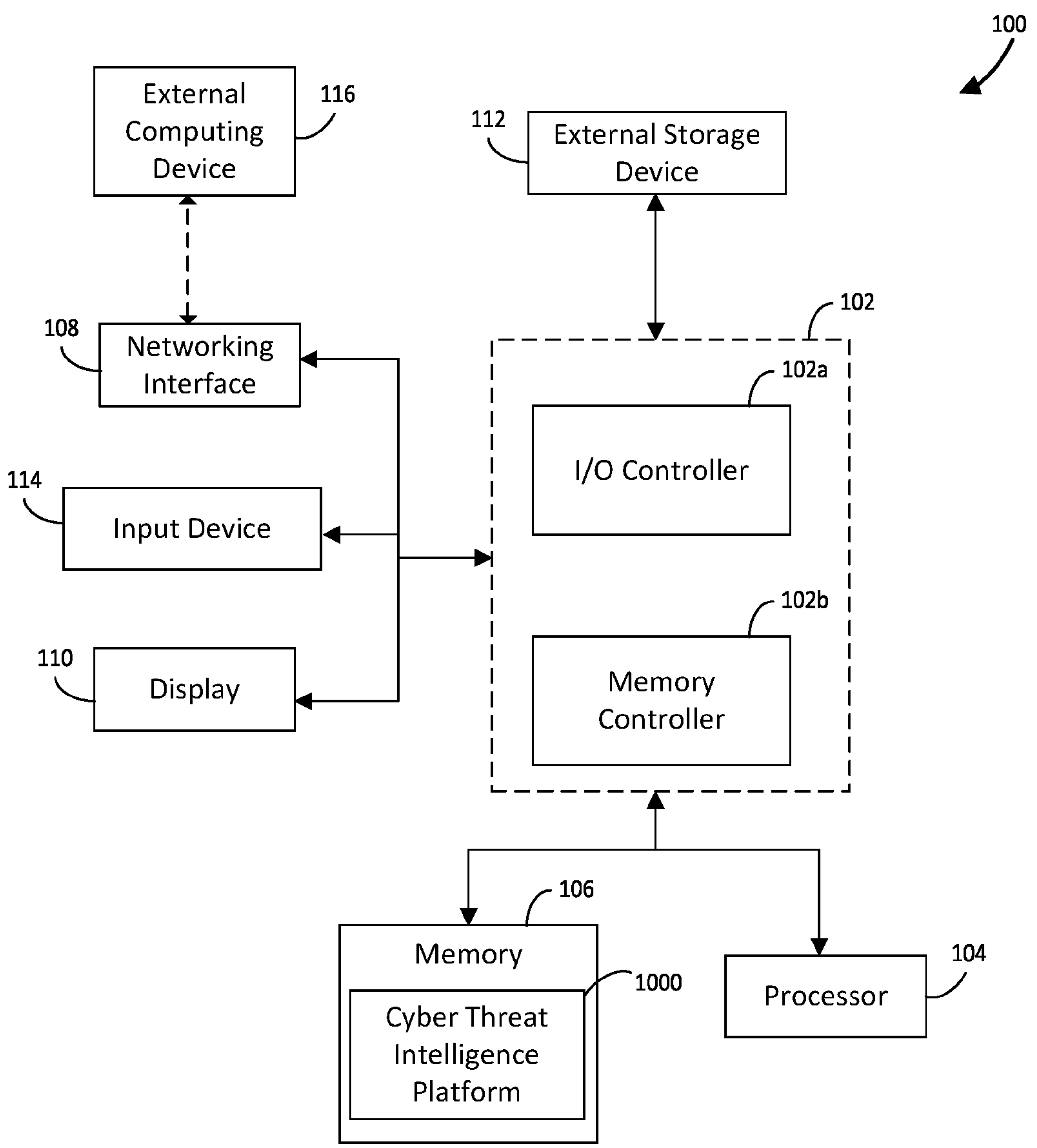
FIG. 1C is a block diagram illustrating an example computing system, in accordance with various embodiments herein.

FIG. 1C is a block diagram illustrating an example computing system 100, in accordance with various embodiments herein. In other examples, fewer, additional, or different components may be present. The computing system 100 may be any suitable computing machine such as a tablet, smart phone, mobile device, laptop computer, desktop computer, server, remote client device, gaming device, smart television device, wearable computer, or any combination thereof. The computing system 100 may include at least one processor 104 coupled to a central hub 102. The central hub 102 may include a memory controller 102*b* and an input/output (I/O) controller 102*a*. Each of a memory 106, a networking interface 108, a display 110, an external storage device 112, and an input device 114 may be coupled to the central hub 102. In certain instances, the memory 106 may be coupled specifically to the memory controller 102*b*; and the external storage device 112, the input device 114, networking interface 108, and the display 110 may be coupled to the I/O controller 102*a*. Other examples of the computing system 100 may be characterized by different architectures.

Broadly speaking, the computing system 100 may represent a node of a distributed ledger system. This distributed ledger system may include a private ledger (e.g., distributed ledger 1003), a public ledger, a federated ledger, and/or any other suitable ledgers or layers and combinations thereof. For example, the computing system 100 may include an Internet of Things (IoT)/device layer (not shown) stored in memory 106. The IoT layer may be a system of interrelated computing devices, mechanical and digital machines, objects, animals or people that are provided with unique identifiers (UIDs) and have the ability to transfer data over a network (via networking interface 108) without requiring human-to-human or human-to-computer interaction.

Users (e.g., cybersecurity participants, etc.) may interact through the computing system 100 by recording transactions of cyber threat intelligence/content and/or other assets via the cyber threat intelligence platform 1000, as described herein. Additionally, other applications, application programming interfaces (APIs), algorithms/models, engines, and/or intelligent user interfaces may also be stored in the memory 106 and utilized with the cyber threat intelligence platform 1000 to facilitate the recordation and/or transfer of assets.

The assets may be real world assets, virtual assets, intellectual assets (e.g., patents, trademarks, copyrights, etc.), and/or any suitable type of assets or combinations thereof. However, as mentioned, the assets described herein may generally be or include cyber threat intelligence/content and/or otherwise described by data (e.g., threat data, threat playbooks, etc.) that is representative of a cyber threat.

In any event, the cyber threat intelligence/content included in records of the cyber threat intelligence platform 1000 and/or otherwise utilized by the processor 104 when updating the cyber threat intelligence platform 1000 may include threat vulnerability notifications, reference architectures, threat response procedures, sets of contacts, vendor indications, policy configurations, education resources, threat intelligence communications, and/or any other suitable data or combinations thereof. Further, the cyber threat intelligence platform 1000 may include instructions that cause the processor 104 to aggregate the cyber threat intelligence/content from other data sources, such as a social media platform, a user computing device, and/or other connected devices.

Accordingly, the cyber threat intelligence platform 1000 may generally include information corresponding to cyber threat intelligence, and cybersecurity more generally. As an example, the cyber threat intelligence platform 1000 may include data corresponding to a cyber threat (e.g., computer virus, software bug, malware) experienced by a participant of the cyber threat intelligence platform 1000. The platform 1000 may also include data corresponding to a set of steps (i.e., a "playbook") other participants may take to avoid/prevent and/or resolve attacks or threats from the cyber threat, or similar threats. This information may further include a set of contacts (e.g., email addresses, phone numbers, etc.) that participants may contact to receive help in resolving attacks from such cyber threats and/or educational content to help participants to avoid similar attacks in the future. Thus, the information stored on and/or otherwise as part of the cyber threat intelligence platform 1000 may represent a holistic approach to educating participants about potential cybersecurity threats and providing these participants with the resources necessary to avoid, mitigate, resolve, repair, and/or otherwise minimize the impacts of known and/or new cyber threats.

In any event, the computing system 100 may also communicate with external computing devices 116 (also referenced herein as "nodes") to perform the validation/consensus process required to update/change entries included in the cyber threat intelligence platform 1000. In certain embodiments, these external computing devices 116 may also be or include integration devices and/or legacy systems that store and/or otherwise include identification information, ownership information, and/or any other suitable information for memories that is relevant to the entries in the cyber threat intelligence platform 1000. For example, the integration devices of the external computing devices 116 may be or include middleware used to transform, route, clone, and/or translate data between multiple computing systems 100.

When the computing system 100 receives and/or otherwise has the necessary cyber threat intelligence/content, and the processor 104 successfully executes the validation/consensus calculations/process, then the processor 104 may record any suitable cyber threat intelligence/content into the cyber threat intelligence platform 1000. As part of this recordation in the cyber threat intelligence platform 1000, the processor 104 may mint a token (e.g., an NFT) representing the cyber threat intelligence/content, where the token acts as a digital deed or certificate of ownership of the cyber threat intelligence/content or impacts resulting therefrom (e.g., views, implementations, and/or positive interactions of other participants).

In addition to minting an NFT representing the cyber threat intelligence/content, the processor 104 may communicate with a third-party certificate authority (e.g., included as part of an external computing device 116) to generate a certificate of authenticity for the owner of the cyber threat intelligence/content, and/or the processor 104 may mint and/or otherwise receive a verifiable credential from an issuer corresponding to the cyber threat intelligence/content. Such a verifiable credential may be or include a hash value representative of a transaction that occurred corresponding to the cyber threat intelligence/content. Therefore, the verifiable credential may represent authenticated transactions corresponding to the cyber threat intelligence/content without storing the cyber threat intelligence/content directly in the cyber threat intelligence platform 1000. The certificate and/or verifiable credential may include a description of the cyber threat intelligence/content, such as a type of cyber threat, a solution to the cyber threat, a reference architecture, a cyber threat playbook, a unique identification number for the cyber threat intelligence/content, etc.; and/or identification information for the owner of the cyber threat intelligence/content, such as a name of the entity that currently owns the cyber threat intelligence/content, an address of the current owner, a phone number of the current owner, etc. The certificate and/or verifiable credential may also include information corresponding to the cyber threat intelligence/content that is recorded in and/or otherwise associated with the cyber threat intelligence platform 1000, such as a reference to the NFT, certificate, and/or verifiable credential representing the cyber threat intelligence/content (e.g., a token ID and/or smart contract address for the NFT).

For example, a first participant may experience a cyber threat that is later recorded on the cyber threat intelligence platform 1000 as cyber threat intelligence/content. This first participant may want to share this cyber threat intelligence/content with a second participant and may authorize a transaction to transfer the cyber threat intelligence/content from their account to the second participant's account on the cyber threat intelligence platform 1000. As part of this transaction, the first participant may issue a verifiable credential corresponding to the cyber threat intelligence/content that is configured to indicate the transfer of ownership from the first participant to the second participant. Thus, the second participant may receive the verifiable credential from the first participant and may proceed to access the cyber threat intelligence/content via the cyber threat intelligence platform 1000. Additionally, or alternatively, the first participant may upload the cyber threat intelligence/content to the cyber threat intelligence platform 1000, and the AI engine 1005 and/or the smart contracts engine 1004 may evaluate the cyber threat intelligence/content and determine how and/or which participants should receive and/or otherwise have access to the cyber threat intelligence/content.

Regardless, the operations described herein and with respect to FIGS. 1A-6C may be performed partially or wholly on, or otherwise using, the processor 104. For example, the processor 104 can execute one or more operations for generating and/or applying instructions included as part of the cyber threat intelligence platform 1000 for analyzing data to perform proof-of-contribution consensus mechanisms, provide new nodes for new participants, orchestrate content sharing/dissemination, perform security actions related to node participation, generate NFTs based on the cyber threat intelligence/content, mint NFTs corresponding to the cyber threat intelligence/content to a distributed ledger 1003, and/or other suitable functions or combinations thereof.

In certain embodiments, and as described herein, the cyber threat intelligence platform 1000 may be or may include one or more AI/ML models configured to perform various operations. The processor 104 can execute instructions stored in the memory 106 to perform the operations. The processor 104 can include one processing device or multiple processing devices or cores. For example, the processor 104 may be or include one or more central processing units (CPUs), one or more graphics processing units (GPUs), one or more Field-Programmable Gate Arrays (FPGAs), one or more application-specific integrated circuits (ASICs), one or more microprocessors, etc.

Further, the processor(s) 104 may be connected to the memory 106 via a computer bus responsible for transmitting electronic data, data packets, or otherwise electronic signals to and from the processor(s) 104 and memory 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute an operating system (OS). The processor(s) 104 may also interface with the memory 106 via the computer bus to create, read, update, delete, or otherwise access or interact with the data stored in the memory 106 and/or the external storage device 112 (e.g., a relational database, such as Oracle, DB2, MySQL, a NoSQL based database, such as MongoDB, or an SIEM, such as Splunk). The data stored in the memories 106 and/or the external storage device 112 may include all or part of any of the data or information described herein, including, for example, training data and/or cyber threat intelligence data (e.g., threat vulnerability notifications, reference architectures, threat response procedures, sets of contacts, vendor indications, policy configurations, education resources, threat intelligence communications, etc.) or other information of the user or corresponding cyber threat intelligence/content. The memory 106 may include one or more persistent memories (e.g., a hard drive and/or solid state memory) and may store one or more applications, modules, and/or models such as the cyber threat intelligence platform 1000.

In general, a computer program or computer based product, application, or code (e.g., the model(s), such as AI/ML models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor 104 (e.g., working in connection with the respective operating system in the memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C#, Objective-C, Java, Scala, ActionScript, JavaScript, HTML, CSS, XML, etc.).

More generally, the memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 106 may store an operating system (OS) (e.g., Microsoft Windows, Linux, Unix, etc.) capable of facilitating the functionalities, apps, methods, or other software as discussed herein. The memory 106 may also store the cyber threat intelligence platform 1000, which may be or include AI/ML based models, such as a machine learning model trained on various training node inputs, distributed ledger inputs and/or other suitable data, as described herein. Additionally, or alternatively, the cyber threat intelligence platform 1000 may also be stored in the external storage device 112, which is accessible or otherwise communicatively coupled to the central hub 102.

The memory 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, a trained AI/ML model or component, such as the AI engine 1005, where each may be configured to facilitate their various functionalities discussed herein. It should be appreciated that one or more other applications may be envisioned and that are executed by the processor 104.

In some examples, the memory 106 can include computer program instructions for executing or applying the cyber threat intelligence platform 1000. For example, the instructions can include the cyber threat intelligence platform 1000 that is executable by the processor 104 for causing the processor 104 to analyze user data to establish a new node for a participant, respond to input prompts from the new participant, analyze content uploaded by the new participant, generate an NFT based on the content, mint the NFT corresponding to the content to a distributed ledger, and/or other suitable actions or combinations thereof. The generation/minting of the NFT may include, for example, generating potential names for the content, and/or determining which data to include and/or reference in the NFT for later access.

More specifically, in certain embodiments, the processor 104 may utilize one or more machine learning (ML) techniques to train the various models of the AI engine 1005 of the cyber threat intelligence platform 1000, or a portion thereof, as a ML model. The AI/ML models may be trained using a training dataset that includes a plurality of training node inputs and a plurality of training distributed ledger inputs, data retrieved from one or more external sources (e.g., external computing device 116, social media platform (s), etc.). The AI/ML models of the AI engine 1005 may use the training dataset to output training responses, node types, threat evaluations, and/or other suitable values or combinations thereof.

In any event, the memory 106 may also include a copy of a cyber threat intelligence platform 1000. Namely, the memory 106 may store a copy of a cyber threat intelligence platform 1000 that is distributed and/or otherwise stored on various other computing systems (e.g., other nodes). The copy of the cyber threat intelligence platform 1000 stored in the memory 106 may include transaction records corresponding to multiple different users and multiple different memories. For example, the cyber threat intelligence platform 1000 may include transaction records corresponding to a smart contract of the smart contracts engine 1004 minting a first reward (e.g., for a highly viewed cyber threat intelligence playbook) and minting a second reward (e.g., another participant contributing a new bug fix).

Therefore, as the memory 106 stores a copy of the cyber threat intelligence platform 1000, the computing system 100 may contribute and/or otherwise participate in updating and/or validating additional entries or changes to the cyber threat intelligence platform 1000 by achieving consensus with the other nodes (not shown) that include a copy of the cyber threat intelligence platform 1000. Further, the cyber threat intelligence platform 1000 may also include the consensus rules and/or other instructions required for the computing system 100 to perform the calculations necessary to validate new additions and/or changes to entries in the distributed ledger 1003. The computing system 100 may communicate with the other connected nodes that participate in the validation/consensus process for the cyber threat intelligence platform 1000 through the networking interface 108.

In particular, the computing system 100 includes a networking interface 108 to connect with external devices, such as the additional nodes that contribute and/or otherwise participate in the updating/changing of entries in the cyber threat intelligence platform 1000 through the consensus process. More specifically, the networking interface 108 may enable the computing system 100 to communicate with other computing systems (e.g., additional nodes) across a network through their respective networking interfaces 108. The networking interface 108 may support wired or wireless communications, such as USB, Bluetooth, Wi-Fi Direct, Near Field Communication (NFC), etc. The networking interface 108 may allow the computing system 100 to communicate with other computing systems via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

The computing system 100 may also provide a display 110, an input device 114, and/or other I/O components (e.g., ports, capacitive or resistive touch sensitive input panels, keys, buttons, lights, LEDs), which may be directly accessible via or attached to the computing system 100 or may be indirectly accessible. According to some embodiments, a user may access the computing system 100 via the input device 114 to review information, make changes, input training data or images, and/or perform other functions.

For example, and to provide for interaction with an individual, the embodiments disclosed herein may be implemented using the display 110, such as a user interface. Such user interfaces may include interactive features such as pop-up or pull-down menus, lists, selection tabs, checkboxes, radio buttons, toggles, sliders, buttons, hyperlinks and/or other features or user interface widgets that can receive human inputs. The display 110 may also include one or more of a number of output mechanisms, such as a display screen, a printer, a speaker, a heads-up display, an AR display, a VR headset, or any other output or display mechanism.

Further, to enable human (and in some instances, machine) user interaction, the computing system 100 may include an input device 114. The input device 114 may be or include, for example, a microphone for speech and audio, a touch sensitive screen for gesture or graphical input, keyboard, mouse, motion input, motion detection, camera for video and photo input, virtual reality gloves, controllers, thumb rings, wands, move controllers, touch controllers, knuckle controllers, glasses with eye controllers, and the like. In some instances, multimodal input devices 114 may enable a user to provide multiple types of input to communicate with the computing system 100.

In certain embodiments, the computing system 100 may also include clients and servers, in a host server configuration. A client and server may generally be remote from each other and may typically interact through a communications network. The relationship of client and server arises by virtue of computer programs running on the respective computers and having a client-server relationship to each other. In some examples, a server transmits data (e.g., an HTML page, data tagged by XML, JSON objects, etc.) to a client device (e.g., for purposes of displaying data to and receiving input from a user interacting with the client device). Data generated at the client device (e.g., as a result of user interaction) can be received from the client device at the server.

More specifically, the computing system 100 may act as a hosting server, and may include a networking interface 108 configured to communicate (e.g., send and receive) data via one or more external/network port(s) to one or more networks or local terminals, as described herein. In some embodiments, the computing system 100 may include a client-server platform technology such as ASP.NET, Java J2EE, Ruby on Rails, Node.js, a web service or online API, responsive for receiving and responding to electronic requests. The computing system 100 may implement the client-server platform technology that may interact, via a computer bus, with the memory 106 (including the applications(s), component(s), API(s), data, etc. stored therein) and/or external storage device 112 to implement or perform the machine readable instructions, methods, processes, elements or limitations, as illustrated, depicted, or described for the various flowcharts, illustrations, diagrams, figures, and/or other disclosure herein. According to some embodiments, the computing system 100 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. In some embodiments, the computer network may comprise a private network or local area network (LAN). Additionally, or alternatively, the computer network may comprise a public network such as the Internet.

Figure 2:
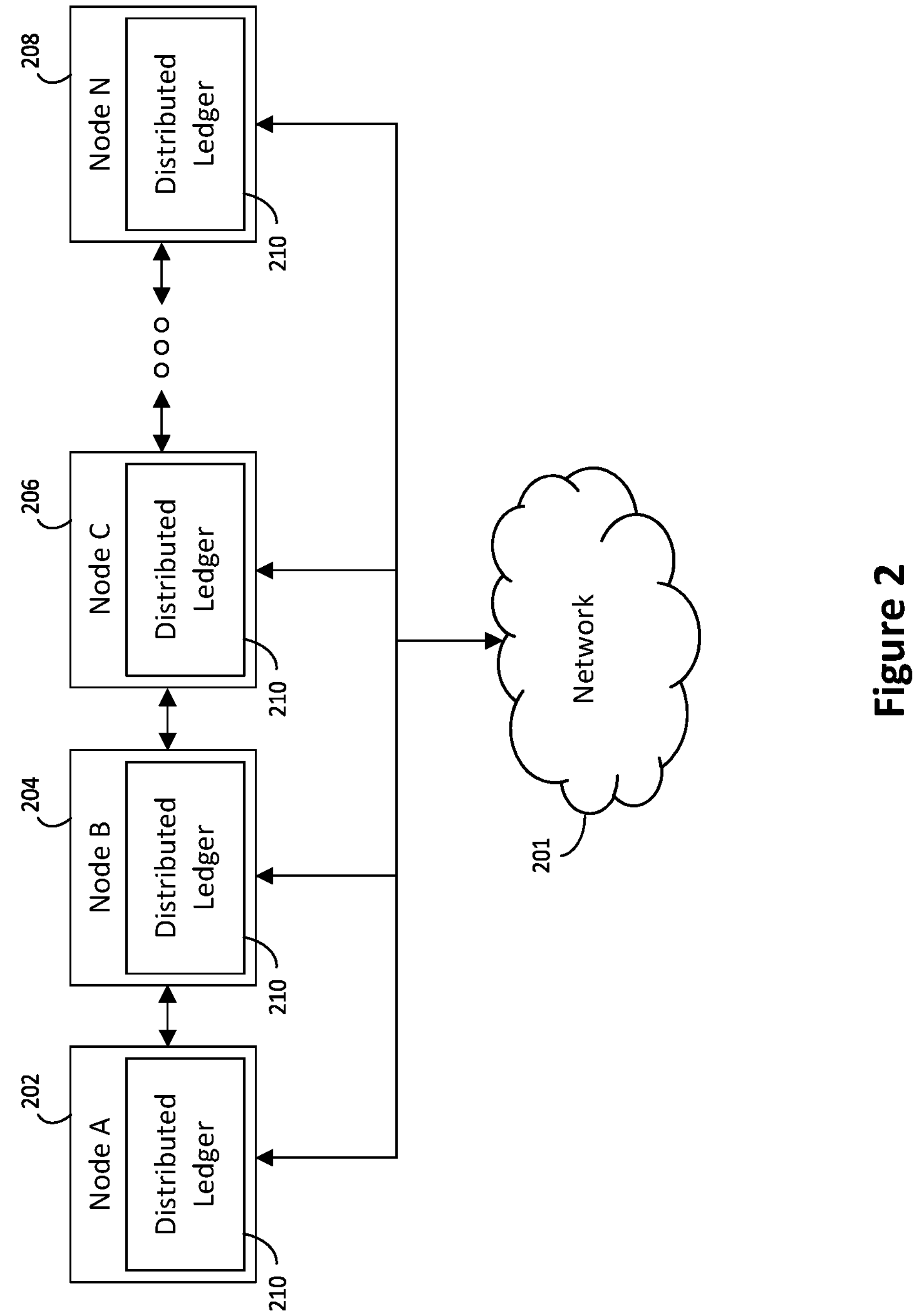
FIG. 2 is an example distributed ledger system for recording transactions and executing smart contracts in a cyber threat intelligence platform, in accordance with various embodiments herein.

FIG. 2 is an example distributed ledger system 200 for recording transactions and executing smart contracts in a cyber threat intelligence platform, in accordance with various embodiments herein. The distributed ledger system 200 includes a distributed ledger 210 and a plurality of nodes 202, 204, 206, and 208. Each node 202-208 may maintain a copy of the distributed ledger 210. As illustrated, N may be any integer value, such that there may be any suitable number of nodes 202-208 that maintain a copy of the distributed ledger 210. The N number of nodes 202-208 may also each be included as part of the consensus mechanism/method used to update/change the distributed ledger 210.

As previously mentioned, as changes are made to the distributed ledger 210, each node 202-208 receives the change via the network 201 and updates its respective copy of the distributed ledger 210. A consensus mechanism may be used by the nodes 202-208 in the distributed ledger system 200 to decide whether it is appropriate to make received changes to the distributed ledger 210. For example, the consensus mechanism may be a proof-of-identify mechanism and a proof-of-contribution mechanism, as described herein. Additionally, or alternatively, the distributed ledger 210 may utilize any suitable consensus mechanism(s) or combinations thereof, such as the Stellar Consensus Protocol (SCP), a variant of Practical Byzantine Fault Tolerance (PBFT), where nodes 202-208 belonging to intersecting groups run a local consensus protocol among their members. As a result of these consensus methods, every intersecting group may participate in the consensus protocol with very low transaction latency. Of course, it should be understood that any suitable consensus mechanism/method or combinations thereof may be used.

Therefore, by maintaining a consensus among the nodes 202-208 to authorize any/all updates/changes to the distributed ledger 210, each node 202-208 in the distributed ledger system 200 may have an identical copy of the distributed ledger 210 to every other copy of the distributed ledger 210 stored by the other nodes 202-208. Accordingly, the distributed ledger system 200 may be more robust than a central authority database system because of the decentralized nature of the distributed ledger 210, such that there is no single point of failure in the distributed ledger system 200 as there is in conventional centralized systems.

To illustrate, Node A 202 may receive a transaction listing from a user indicative of an action corresponding to a new piece of cyber threat intelligence/content, an NFT corresponding to a reward associated with the cyber threat intelligence/content, and/or any other suitable data or combinations thereof. Node A 202 may generate a transaction representing and/or otherwise based upon the transaction listing and may tentatively upload the transaction to the distributed ledger 210. This uploaded transaction may be transmitted to each of the connected nodes 204-208, where each connected node 204-208 independently performs the calculations necessary to validate the authenticity of the transaction for recordation in the distributed ledger 210. Upon reaching a consensus among all nodes 202-208, the transaction corresponding to the cyber threat intelligence/content may be officially recorded in the distributed ledger 210 and represented in all copies of the distributed ledger 210 in all connected nodes 202-208.

Figure 3:
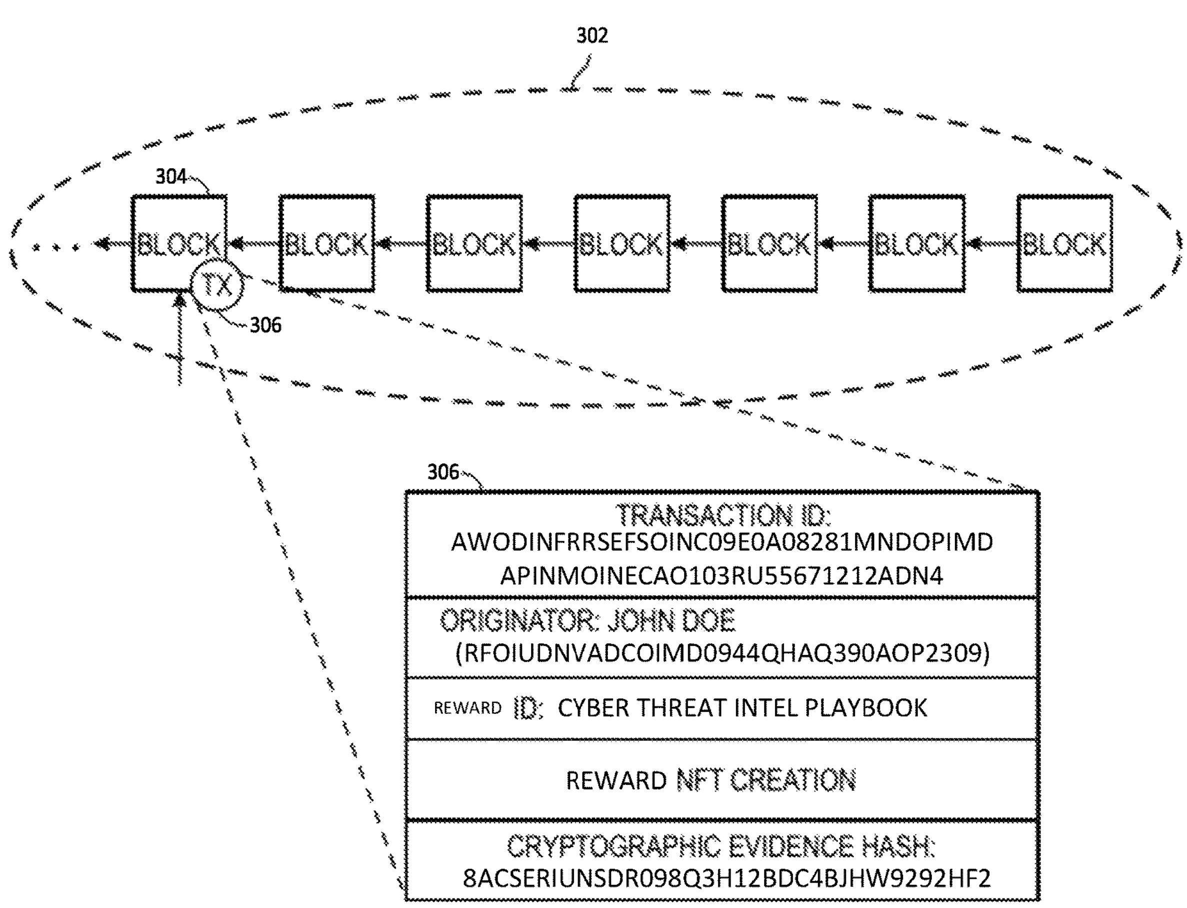
FIG. 3 illustrates an example transaction recording identification information for a reward in a distributed ledger, in accordance with various embodiments herein.

Example Transaction Recordation of Cyber Threat Intelligence Content and Rewards in a Distributed Ledger FIG. 3 illustrates an example transaction 306 recording identification information for a reward in a distributed ledger 302 of the distributed ledger 210 illustrated in FIG. 2, and in accordance with various embodiments herein. The transaction 306 may include a transaction ID and an originator such as John Doe who is the creator or original owner of the cyber threat intelligence/content associated with the reward (identified by a cryptographic proof-of-identity and/or proof-of-contribution). The transaction 306 may also include identification information for the reward, such as a description of the reward or intelligence/content resulting in the reward ("CYBER THREAT INTEL PLAYBOOK") and/or a unique identification number for the reward, such as an NFT. Of course, it should be appreciated that the transaction 306 may include and/or otherwise reference any suitable information corresponding to the reward and/or the participant/entity listing the transaction.

In some embodiments, the transaction 306 may mint an NFT representing the reward and/or cyber threat intelligence/content which includes properties of the reward and/or underlying content, such as the identification information. The NFT may be recorded in the distributed ledger 302 and may thereby be available for reference as part of the listed transaction. In certain embodiments, an NFT representing the reward may be obtained from an external system. The transaction may then record the obtained NFT in the distributed ledger 302.

Furthermore, the transaction 306 may include a cryptographic hash of the identification information. For example, the transaction 306 illustrated in FIG. 3 includes a cryptographic evidence hash that is stored in the distributed ledger 302 as part of the transaction 306. In some embodiments, the identification information may not be stored as a cryptographic hash but may be directly accessible in block 304 by an observer or other network participant.

To facilitate the transfer of cyber threat intelligence/content and/or rewards and ensure transparency in transactions involving this content, the nodes (e.g., Node A 202, Node B 204) that participate in the validation/consensus mechanism for a distributed ledger (e.g., distributed ledger 302) may generate and display user interfaces on client devices of users. A client device may be a smart phone, a tablet, a laptop computer, a desktop computer, a wearable device such as a smart watch or smart glasses, etc. The client devices may communicate directly with a distributed ledger, such as the distributed ledger 302 as shown in FIG. 3. In other embodiments, a server device may connect to and/or otherwise monitor the distributed ledger 302, obtain transaction information from the distributed ledger 302, and may provide the transaction information to a client device for display to the user. Therefore, in certain embodiments, the client device may be a node connecting directly to the distributed ledger 302, and in other embodiments, the client device may connect to a node that is connected to the distributed ledger 302.

Figure 4A:
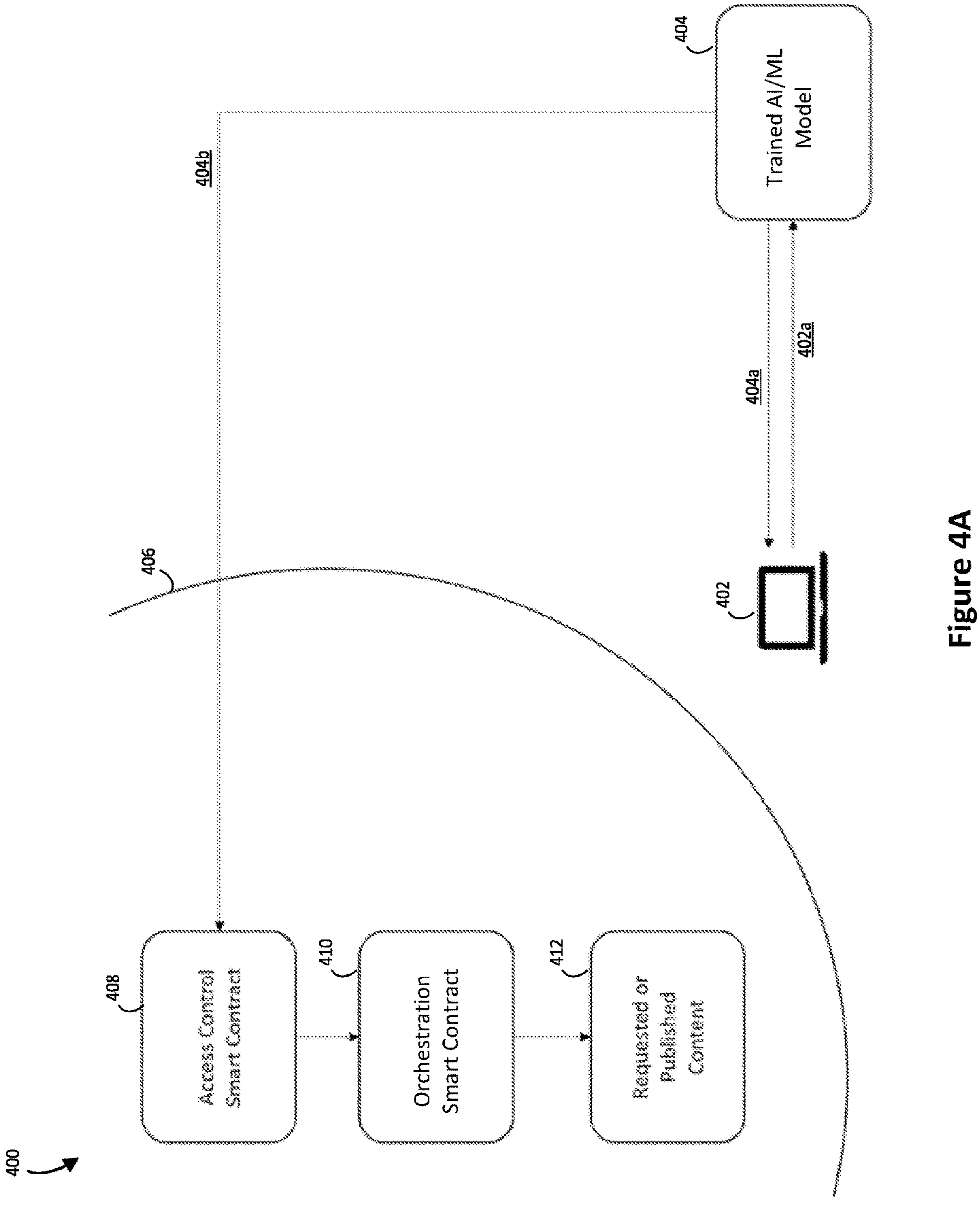
FIG. 4A depicts an example smart contract authentication and content access workflow, in accordance with various embodiments herein.

Example Content Orchestration and Distributed Ledger Blocks for Recording Such Content FIG. 4A depicts an example smart contract authentication and content access workflow 400, in accordance with various embodiments herein. Generally, the smart contract authentication and content access workflow 400 may involve an interaction between a participant node 402 and a cyber threat intelligence platform (e.g., cyber threat intelligence platform 1000). More specifically, the workflow 400 may include the smart contracts engine 1004 and the AI engine 1005 executing smart contracts and generating responses to authorize the participant node 402 and retrieve and/or otherwise access the cyber threat intelligence/content stored and/or otherwise accessible from the cyber threat intelligence platform.

As mentioned, each smart contract may perform a specific function. The functions invoked for a particular request may be based on the attributes of the node publishing the request to an access control contract for authorization to access/utilize downstream smart contracts engine 1004 functions. Namely, as illustrated in the example smart contract authentication and content access workflow 400, the participant node 402 may transmit a request 402*a* to a trained AI/ML model 404 of the AI engine 1005. The request 402*a* may include a request to access content stored on the cyber threat intelligence platform and/or the request 402*a* may include content that should be posted/stored within the platform. As part of the request 402*a*, the participant node 402 may transmit or include a public key used to authenticate the node 402 and/or the content requested or provided by the node 402.

The trained AI/ML model 404 may perform an authentication mechanism to ensure that the participant node 402 is authorized to provide and/or request the content indicated in the request 402*a*. If the trained AI/ML model 404 determines that the participant node 402 is authorized, the trained AI/ML model 404 may access the private distributed ledger 406, in part, by executing an access control smart contract 408 from the smart contracts engine 1004. The access control smart contract 408 may verify the participant node's 402 credentials and/or otherwise confirm that the participant node is authorized to provide and/or request the content indicated in the request 402*a* and may transmit the request to another smart contract from the smart contracts engine 1004. This subsequent smart contract may be configured to control the orchestration of content stored and/or otherwise accessible from the cyber threat intelligence platform, and may retrieve and/or store the content 412 indicated in the request 402*a*. The trained AI/ML model 404 may then transmit the requested content 412 and/or an indication that the submitted content was stored on the platform in a response 404*a* to the participant node 402.

Figure 4B:
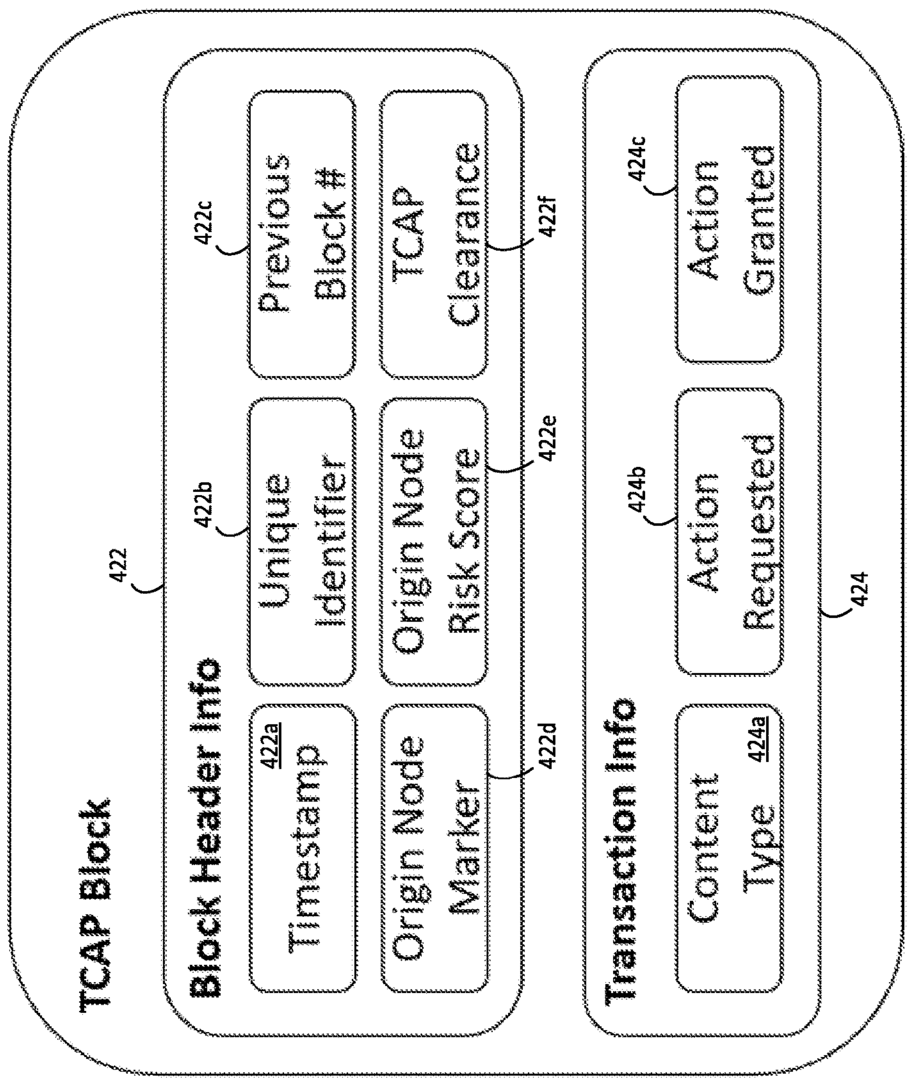
FIG. 4B depicts an example block included as part of an example distributed ledger utilized by the distributed cyber threat intelligence platform of FIG. 1A, in accordance with various embodiments herein.
Figure 4B:

FIG. 4B depicts an example block 420 included as part of an example distributed ledger (e.g., distributed ledger 1003) utilized by the distributed cyber threat intelligence platform 1000 of FIG. 1A, in accordance with various embodiments herein. As mentioned, the distributed ledger 1003 may be a private blockchain with unique block attributes. For example, each block on the distributed ledger 1003 may include a block header 422 that contains metadata about the block and transaction information 424 about the on-chain transaction.

The metadata included in the block header 422 may be and/or include a timestamp 422*a*, a unique block identifier 422*b*, a reference to the previous block 422*c*, a reference to the node from which the broadcast originated 422*d*, a node risk score 422*e*, a clearance level 422*f*, an authentication flag (not shown), and/or any other suitable information or combinations thereof. The transaction information 424 may be or include a content type 424*a*, action requested 424*b* associated with the content, action granted 424*c* associated with the content.

EXAMPLE METHODS

Figure 5A:
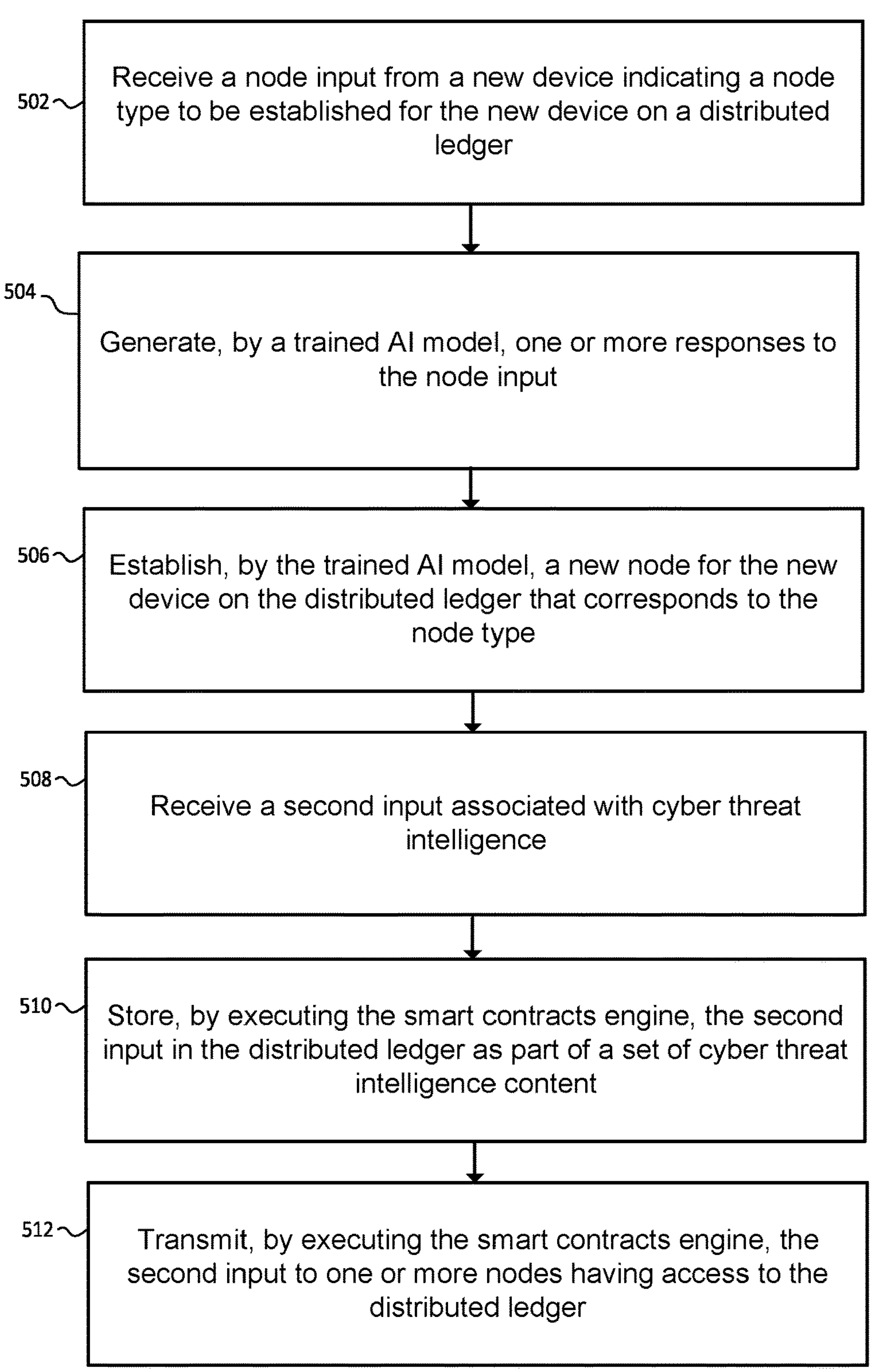
FIG. 5A is a block diagram of an example computer-implemented method for providing a distributed cyber threat intelligence platform, in accordance with various embodiments herein.

FIG. 5A is a block diagram of an example computer-implemented method 500 for providing a distributed cyber threat intelligence platform, in accordance with various embodiments herein. Generally speaking, any of the actions described herein in reference to the method 500 may be performed by a node (e.g., nodes 202-208, 302, 304), a server device, and/or any combinations thereof.

At block 502, the method 500 may include receiving, at one or more processors executing an AI engine, a node input from a new device indicating a node type to be established for the new device on a distributed ledger. At block 504, the method 500 may include generating, by executing a trained AI model of the AI engine, one or more responses to the node input. At block 506, the method 500 may include establishing, by executing the trained AI model, a new node for the new device on the distributed ledger that corresponds to the node type.

At block 508, the method 500 may include receiving, at the one or more processors executing a smart contracts engine, a second input associated with cyber threat intelligence. At block 510, the method 500 may include storing, by executing a first smart contract of the smart contracts engine, the second input in the distributed ledger as part of a set of cyber threat intelligence content. At block 512, the method 500 may include transmitting, by executing a second smart contract of the smart contracts engine, the second input to one or more nodes having access to the distributed ledger.

In some embodiments, the method 500 may further include: evaluating, by the one or more processors executing the trained AI model, the second input received from the new node; generating, by the one or more processors executing the trained AI model, composite cyber threat content by combining portions of the second input and one or more inputs previously stored on the distributed ledger as part of the set of cyber threat intelligence content; and disseminating, by the one or more processors, the composite cyber threat content to each of the one or more nodes.

Further in these embodiments, disseminating the composite cyber threat content is performed anonymously, such that no participating node has an indication of any other participating node that contributed to the composite cyber threat content. However, composite cyber threat content may generally be shared anonymously or non-anonymously. For example, the platform may include an anonymization option that a participating node may toggle before broadcasting the communication to other nodes, thereby anonymously broadcasting the communication. If the participating node chooses not to toggle the anonymization option, the broadcast communication may include identifying information of the participating node that initiated the broadcast.

In certain embodiments, the trained AI model may include a large language model (LLM) trained using a plurality of training node inputs and a plurality of training distributed ledger inputs to output training responses, node types, and threat evaluations.

In some embodiments, the method 500 may further include: determining, by the one or more processors executing a reward engine, that a first node of the one or more nodes has satisfied a reward threshold corresponding to at least one of: (i) a contribution threshold, (ii) a bug discovery threshold, or (iii) a suggestion threshold by: evaluating a contribution level of the first node to determine whether the first node has satisfied the contribution threshold, evaluating a bug discovery value of the first node to determine whether the first node has satisfied the bug discovery threshold, or evaluating one or more suggestions contributed by the first node to determine whether the first node has satisfied the suggestion threshold; generating, by the one or more processors executing the reward engine, a non-fungible token (NFT) based on the reward threshold; and minting, by the one or more processors executing the reward engine, the NFT to the distributed ledger, wherein a portion of data associated with the reward threshold is linked to the NFT.

In certain embodiments, the method 500 may further include evaluating the contribution level of a node by, in part, evaluating a time threshold associated with the contribution level. If the contribution level of a particular node exceeds the time threshold, the particular node may be restricted from contributing additional content for a predetermined period of time. For example, the time threshold may impose limits on the volume of content or other material each node may contribute within an hour, one day, one week, one month, etc.

In certain embodiments, the smart contracts engine may include at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

In some embodiments, each node of the one or more nodes may include a clearance level value, and the method 500 may further include: receiving, at the one or more processors executing the AI engine, an indication of a potentially compromised node of the one or more nodes; transmitting, by the one or more processors executing the smart contracts engine, a polling prompt to each node of the one or more nodes without transmitting the polling prompt to the potentially compromised node; receiving, at the one or more processors executing the smart contracts engine, a poll response from each node; and responsive to receiving the poll response from each node, isolating, by the one or more processors executing the smart contracts engine, the potentially compromised node from participating on the distributed ledger by adjusting the clearance level value of the potentially compromised node.

In certain embodiments, the method 500 may further include: receiving, at the one or more processors from the new node, an indication of the second input associated with cyber threat intelligence; evaluating, by the one or more processors executing the AI engine, a proof-of-contribution for the new node based on the indication; and allocating, by the one or more processors executing the AI engine, an increased level of voting power to the new node, in accordance with the proof-of-contribution.

In some embodiments, the first smart contract is identical to the second smart contract.

In certain embodiments, the set of cyber threat intelligence content may include at least one of: (i) a threat vulnerability notification, (ii) a reference architecture, (iii) a threat response procedure, (iv) a set of contacts, (v) a vendor indication, (vi) a policy configuration, (vii) an education resource, or (viii) a threat intelligence communication.

Figure 5B:
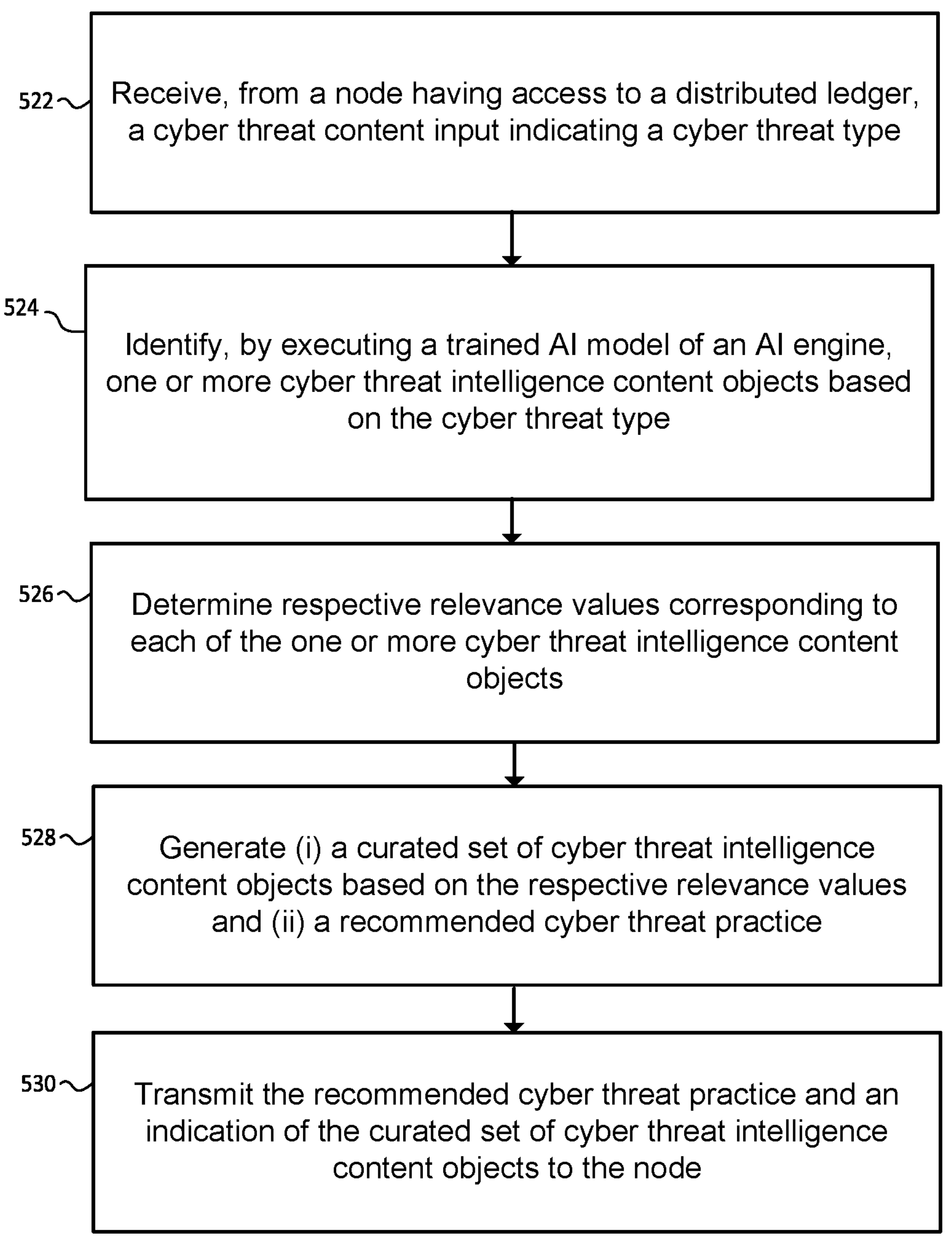
FIG. 5B is a block diagram of an example computer-implemented method for providing AI mediated curation of access and content within a cyber threat intelligence platform, in accordance with various embodiments herein.

FIG. 5B is a block diagram of an example computer-implemented method 520 for providing AI mediated curation of access and content within a cyber threat intelligence platform, in accordance with various embodiments herein. Generally speaking, any of the actions described herein in reference to the method 520 may be performed by a node (e.g., nodes 202-208, 302, 304), a server device, and/or any combinations thereof.

At block 522, the method 520 may include receiving, at one or more processors from a node having access to a distributed ledger, a cyber threat content input indicating a cyber threat type. At block 524, the method 520 may include identifying, by executing a trained AI model of an AI engine, one or more cyber threat intelligence content objects based on the cyber threat type, each of the one or more cyber threat intelligence content objects being (a) contributed by one or more of one or more nodes having access to the distributed ledger or (b) generated by the trained AI model.

The method 520 may include evaluating, by executing the trained AI model, each of the one or more cyber threat intelligence content objects to: determine respective relevance values corresponding to each of the one or more cyber threat intelligence content objects (block 526), and generate (i) a curated set of cyber threat intelligence content objects based on the respective relevance values and (ii) a recommended cyber threat practice (block 528). At block 530, the method 520 may include transmitting the recommended cyber threat practice and an indication of the curated set of cyber threat intelligence content objects to the node.

In certain embodiments, the one or more cyber threat intelligence content objects are stored on the distributed ledger.

In some embodiments, the method 520 may include: receiving, at the one or more processors, a second input from a second node indicating a new cyber threat intelligence content object to be included as part of a set of cyber threat intelligence content objects stored on the distributed ledger; evaluating, by the one or more processors executing the trained AI model, the second input received from the second node to determine a set of inputs previously stored on the distributed ledger that satisfy a relevance threshold relative to the new cyber threat intelligence content object; generating, by the one or more processors executing the trained AI model, a composite cyber threat content object by combining portions of the second input and the set of inputs previously stored on the distributed ledger; and disseminating, by the one or more processors, the composite cyber threat content object to each of the one or more nodes having access to the distributed ledger.

Further in these embodiments, disseminating the composite cyber threat content is performed anonymously, such that no participating node has an indication of any other participating node that contributed to the composite cyber threat content. However, composite cyber threat content may generally be shared anonymously or non-anonymously. For example, the platform may include an anonymization option that a participating node may toggle before broadcasting the communication to other nodes, thereby anonymously broadcasting the communication. If the participating node chooses not to toggle the anonymization option, the broadcast communication may include identifying information of the participating node that initiated the broadcast.

In certain embodiments, the trained AI model may comprise a large language model (LLM) trained using a plurality of training node inputs and a plurality of training distributed ledger inputs to output training responses, node types, and threat evaluations.

In some embodiments, the method 520 may include receiving, at the one or more processors from a node having access to the distributed ledger, an update to a set of contacts stored on the distributed ledger; determining, by the one or more processors executing the trained AI model, an estimated adjustment to the set of contacts based on the update; broadcasting, by the one or more processors, the estimated adjustment to each of one or more nodes having access to the distributed ledger; responsive to receiving a consensus regarding the estimated adjustment, updating, by the one or more processors, the set of contacts based on the estimated adjustment; and broadcasting, by the one or more processors, an updated set of contacts indication to the one or more nodes. In certain embodiments, updating the set of contacts based on the estimated adjustment includes generating a new transaction for execution on the distributed ledger that indicates the update to the set of contacts, and republishing the set of contacts with the estimated adjustment by executing the new transaction on the distributed ledger.

In certain embodiments, the method 520 may include identifying, by executing the trained AI model, a block conflict associated with the distributed ledger; analyzing, by the one or more processors executing the trained AI model, at least one of (i) a timestamp corresponding with one or more of the one or more nodes having access to the distributed ledger or (ii) a block nonce of one or more blocks on the distributed ledger; and determining, by the one or more processors executing the trained AI model, a correlated block position to resolve the block conflict.

In some embodiments, the trained AI model includes a retrieval augmented generation (RAG) model, and the method 520 may include identifying the one or more cyber threat intelligence content objects by: retrieving, by the one or more processors executing the RAG model, data from at least one of: (i) the distributed ledger or (ii) a source external to the distributed ledger.

In certain embodiments, the method 520 may include: receiving, at the one or more processors, a node input from a new device indicating a node type to be established on the distributed ledger for the new device; generating, by the one or more processors executing the trained AI model, one or more responses to the node input; and establishing, by the one or more processors executing the trained AI model, a new node for the new device on the distributed ledger that corresponds to the node type, wherein the node type is at least one of: (i) a light node, (ii) a partial node, or (iii) a full node.

In some embodiments, the method 520 may include receiving, at the one or more processors from the new node, an indication of a new input associated with cyber threat intelligence; evaluating, by the one or more processors executing the trained AI model, a proof-of-contribution for the new node based on the indication; and allocating, by the one or more processors executing the trained AI model, an increased level of voting power to the new node, in accordance with the proof-of-contribution.

Further in these embodiments, the AI engine monitors each participating node for potential compromise. When the AI engine detects activity from a particular node indicating that the particular node may be compromised, the AI engine may execute a polling smart contract that, in turn, may execute the node isolation smart contract. Accordingly, the executing the node isolation smart contract may remove the particular node from the network/platform and/or otherwise prevent the particular node from accessing the network/platform.

Figure 5C:
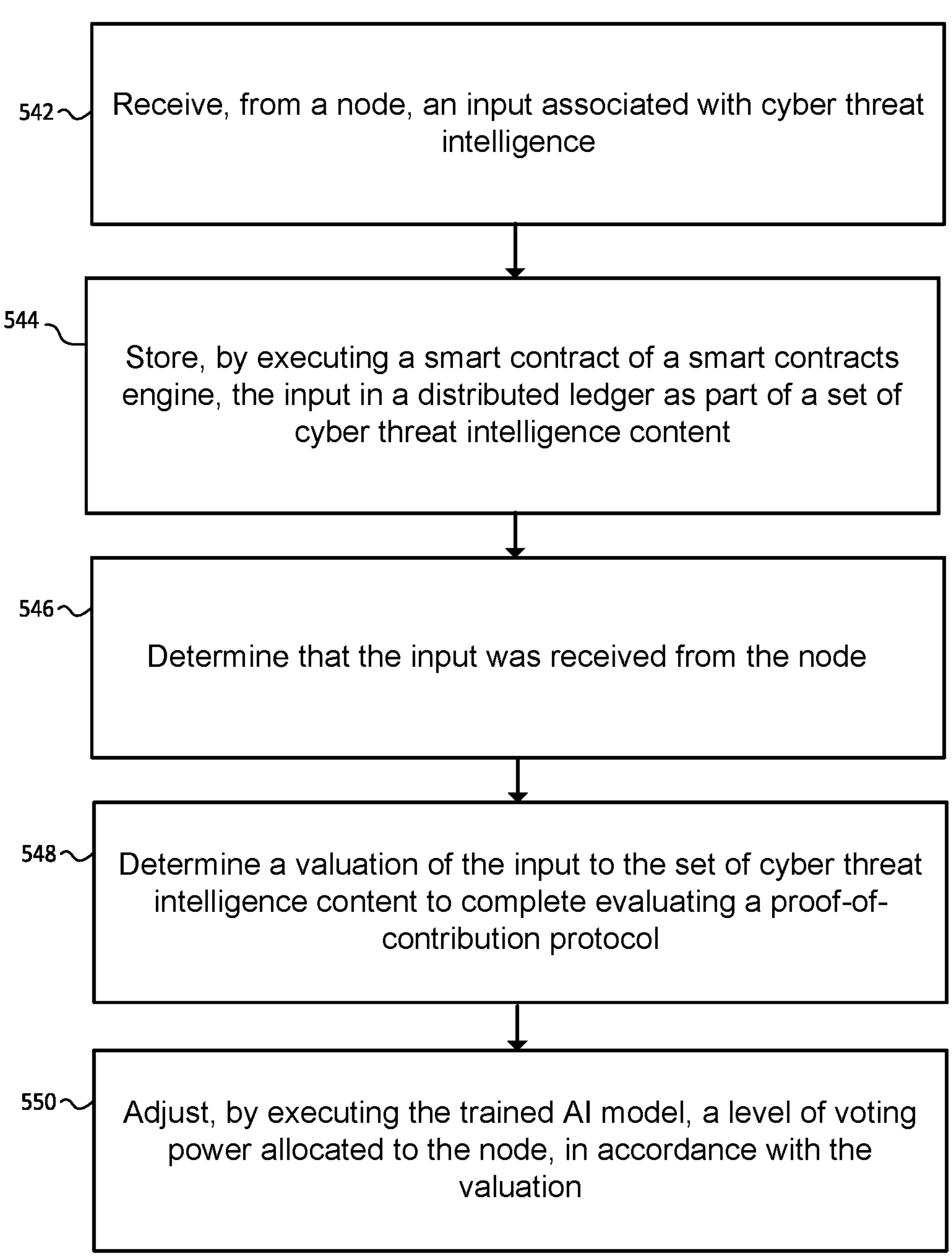
FIG. 5C is a block diagram of an example computer-implemented method for leveraging proof-of-contribution on a distributed cyber threat intelligence platform, in accordance with various embodiments herein.

FIG. 5C is a block diagram of an example computer-implemented method 540 for leveraging proof-of-contribution on a distributed cyber threat intelligence platform, in accordance with various embodiments herein. Generally speaking, any of the actions described herein in reference to the method 540 may be performed by a node (e.g., nodes 202-208, 302, 304), a server device, and/or any combinations thereof.

At block 542, the method 540 may include receiving, at one or more processors from a node, an input associated with cyber threat intelligence. At block 544, the method 540 may store, by executing a smart contract of a smart contracts engine, the input in a distributed ledger as part of a set of cyber threat intelligence content, the distributed ledger being accessible by one or more nodes.

The method 540 may further include evaluating, by executing a trained AI model of an AI engine, a proof-of-contribution protocol for the node by: determining that the input was received from the node (block 546), and determining a valuation of the input to the set of cyber threat intelligence content (block 548). At block 550, the method 540 may include adjusting, by executing the trained AI model, a level of voting power allocated to the node, in accordance with the valuation. Of course, as described herein, the inputs/contributions evaluated for a particular node may include cyber threat intelligence content, data storage and/or data processing power offered to the blockchain, governance proposal(s) and/or smart contract(s) that are authorized for storage/implementation on the platform, a training and/or reference architecture that is developed and shared with other platform participants, and/or any other suitable input/contribution or combinations thereof.

In some embodiments, the method 540 may determine the valuation of the input by: evaluating, by the one or more processors executing the trained AI model, one or more of: (i) a file size of the input, (ii) a recency of a cyber threat indicated by the input, (iii) a threat value associated with the cyber threat, (iv) a node voting value, (v) processing power value of the input, (vi) a storage value of the input, (vii) a smart contract contribution value, (viii) an AI model contribution value, or (ix) an input process value. In these embodiments, the node voting value may correspond with another node interacting with the input and providing a vote (or other similar feedback) indicating approval and/or a value of the input.

Further in these embodiments, the storage value of the input and the processing power value of the input correspond to an amount of processing power or storage space a participant node provides to the cyber threat intelligence platform. The smart contract and the AI model contribution values generally correspond to the contributions of a smart contract and/or an AI model made by a participant node to the cyber threat intelligence platform that are voted for adoption/implementation on the platform. The input process value represents a value resulting from the AI engine receiving content used to facilitate a process of the platform. For example, the AI engine may receive a threat playbook and analyze the threat playbook to determine that the playbook should be used to train an AI model. When the threat playbook is used to train the AI model, the AI engine may increase and/or otherwise adjust the input process value associated with the threat playbook because the playbook contributed to a process of training an AI model and can be melded with other participant node threat playbooks.

In certain embodiments, the smart contracts engine may comprise at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

In some embodiments, the trained AI model may comprise a large language model (LLM) trained using a plurality of training node inputs and a plurality of training distributed ledger inputs to output training responses, node types, and threat evaluations.

In certain embodiments, each node of the one or more nodes may include a clearance level value, and the method 540 may further include: receiving, at the one or more processors, an indication of a potentially compromised node of the one or more nodes; transmitting, by the one or more processors executing the smart contracts engine, a polling prompt to each node of the one or more nodes without transmitting the polling prompt to the potentially compromised node; receiving, at the one or more processors, a poll response from each node; and responsive to receiving the poll response from each node, isolating, by the one or more processors executing the smart contracts engine, the potentially compromised node from accessing the distributed ledger by adjusting the clearance level value of the potentially compromised node.

In some embodiments, the method 540 may include determining, by executing a rewards engine, that a first node of the one or more nodes has satisfied a reward threshold; generating, by the one or more processors executing the rewards engine, a non-fungible token (NFT) based on the reward threshold; and minting, by the one or more processors executing the rewards engine, the NFT to the distributed ledger, wherein a portion of data associated with the reward threshold is linked to the NFT.

In certain embodiments, the reward threshold may correspond to at least one of: (i) a contribution threshold, (ii) a bug discovery threshold, or (iii) a suggestion threshold, and the method 540 may further comprise: evaluating, by the one or more processors executing the rewards engine, a contribution level of the first node to determine whether the first node has satisfied the contribution threshold; evaluating, by the one or more processors executing the rewards engine, a bug discovery value of the first node to determine whether the first node has satisfied the bug discovery threshold; or evaluating, by the one or more processors executing the rewards engine, one or more suggestions contributed by the first node to determine whether the first node has satisfied the suggestion threshold.

In some embodiments, the method 540 may include determining, by the one or more processors executing the smart contracts engine, a storage location for the input based on at least one of: (i) a file size of the input or (ii) an update frequency of the input; and responsive to determining that the file size of the input fails to satisfy a file size threshold or that the update frequency of the input fails to satisfy an update frequency threshold, determining, by the one or more processors executing the smart contracts engine, the storage location for at least a portion of the input to be a first storage location that is separate from the distributed ledger. For example, the first storage location that is separate from the distributed ledger may be or include an S3 bucket and/or an external SIEM location, such as Splunk.

Figure 6A:
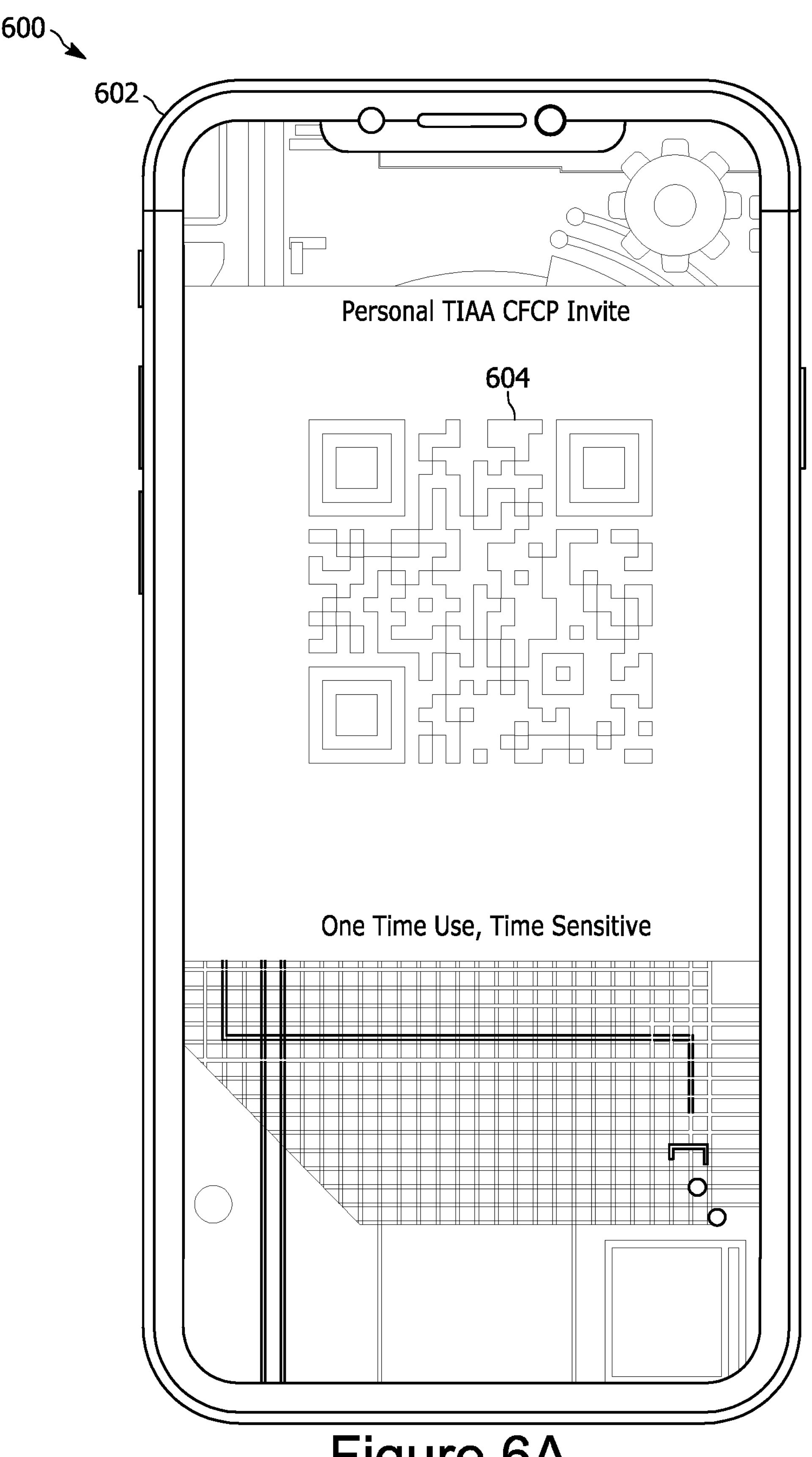
FIGS. 6A-6C depict example graphical user interfaces (GUIs) displaying various options for a user to interact with cyber threat intelligence content, in accordance with various embodiments herein.
Figure 6B:
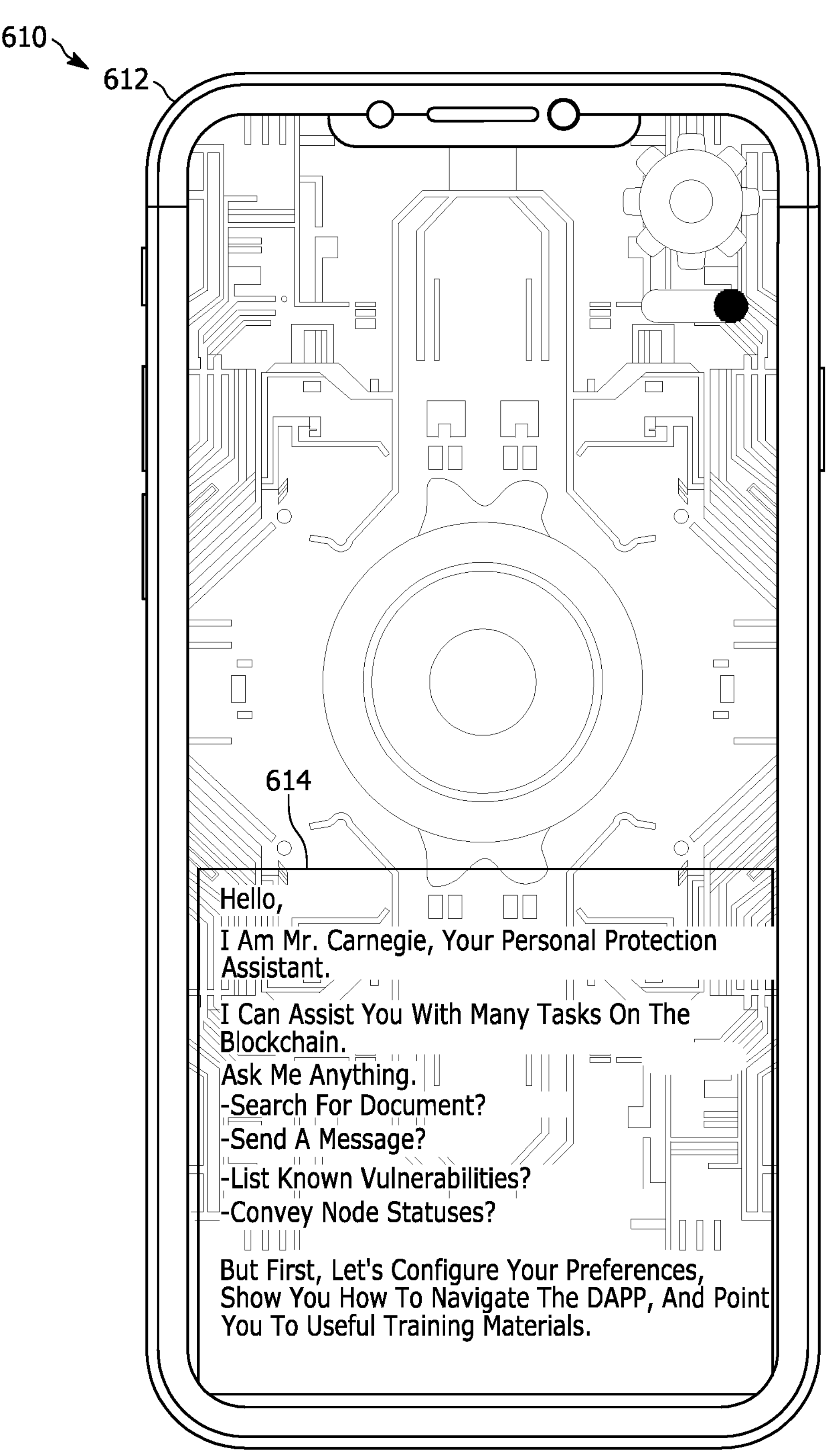
Figure 6C:
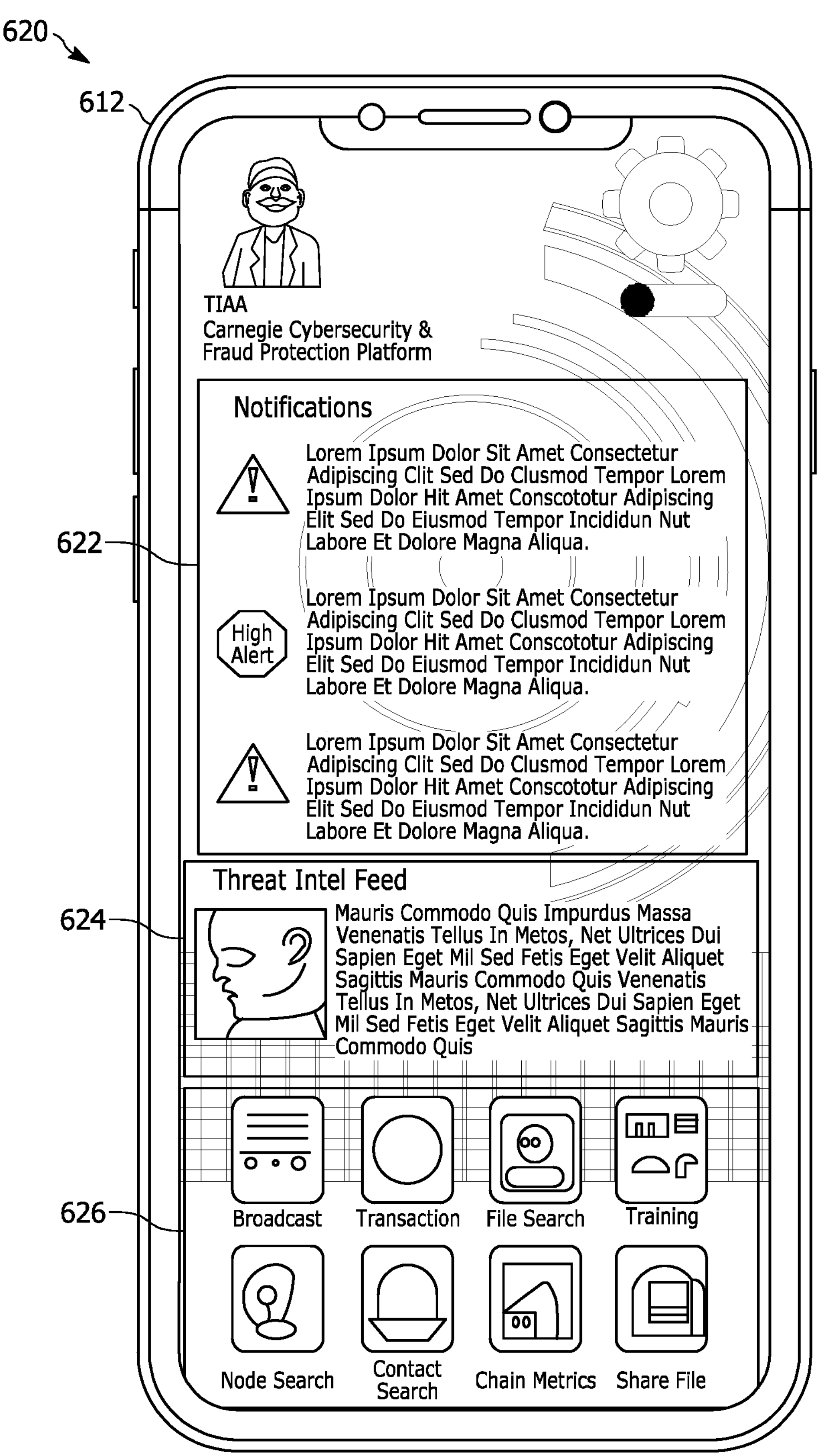

Example Graphical User Interfaces (GUIs) for Interacting with Cyber Threat Intelligence Content FIGS. 6A-6C depict example graphical user interfaces (GUIs) displaying various options for a user to interact with cyber threat intelligence content, in accordance with various embodiments herein.

FIG. 6A generally illustrates a node invitation GUI 600, where a prospective participant requesting access to a cyber threat intelligence platform may scan a QR code 604 from the display screen of the current participant device 602. In particular, a prospective participant of the cyber threat intelligence platform may request to join the platform from an active participant of the platform that already has an established node with access to the platform. This active participant may query the platform for the QR code 604 to provide the prospective participant, which the prospective participant may scan with their respective device. Scanning the QR code 604 may install a containerized application (e.g., a light node) on the prospective participant's device, which may collect information from the prospective participant's device and install the trained AI/ML model to initiate the onboarding process.

The prospective participant may use their device to scan the QR code, and the prospective participant may begin the onboarding process to establish a node (e.g., trial light node, partial node, full node) and begin accessing/contributing to the cyber threat intelligence platform. The platform may utilize this QR code 604 and/or other suitable code generation feature to enable active participants to engage with prospective participants and allow such prospective participants the opportunity to join the platform if the active participant trusts the prospective participant. Of course, the prospective participant may still be required to satisfy certain criteria and/or consensus mechanisms (e.g., proof-of-identity, proof-of-contribution, proving the QR code was provided by full node, etc.) to successfully join and/or contribute/access the full features of the platform. Regardless, in this manner, the cyber threat intelligence platform of the present disclosure enables rapid, efficient onboarding of new participants, which in turn, increases participation and the benefits achieved from a shared cyber security platform.

FIG. 6B generally illustrates an onboarding GUI 610, where a new participant may interact with a trained AI/ML model of the cyber threat intelligence platform to onboard/familiarize the participant with the platform. In particular, the onboarding GUI 610 may be rendered on the prospective participant device 612, and the onboarding GUI 610 may include a set of prompts 614 generated and output by the trained AI/ML model.

As illustrated in FIG. 6B, the set of prompts 614 may generally include an introduction and other statements meant to convey the capabilities of the trained AI/ML model and/or the cyber threat intelligence platform. For example, the set of prompts 614 includes a statement that "I am Mr. Carnegie, your personal protection assistant. I can assist you with many tasks on the Blockchain. Ask me anything," thereby indicating that the trained AI/ML model (and the underlying AI engine 1005) may facilitate many/most of the functions on the cyber threat intelligence platform. The set of prompts 614 may also provide a non-exhaustive listing of such functions including "Search for a document?", "Send a message?", "List known vulnerabilities?", "Convey Node Statuses?", and/or any other suitable functions corresponding to the cyber threat intelligence platform, such as those described herein.

As part of the onboarding process, the trained AI/ML model may walk the new participant through functionalities/configurations of the platform and discuss the new participant's preferences associated with these functionalities/configurations. Namely, the set of prompts 614 indicates "[b]ut first, let's configure your preferences, show you how to navigate the DAPP, and point you to useful training materials." The new participant may interact with the trained AI/ML model by inputting response queries/prompts, to which, the trained AI/ML model may respond as the model takes the new participant through the onboarding process.

Once the new participant successfully completes the onboarding process, the new participant may have access to the cyber threat intelligence platform. FIG. 6C generally illustrates a platform GUI 620, where a participant may access various features and content of a cyber threat intelligence platform. In particular, the platform GUI 620 includes several sections 622, 624, 626 where a participant may access and/or otherwise interact with the content and features included as part of the platform.

For example, the platform GUI 620 includes a notifications section 622 where up-to-date and/or real-time notifications associated with cyber threat intelligence may be displayed for viewing by the participant. The notifications displayed in the notification section 622 may be or include, e.g., new threat alerts corresponding to a newly discovered vulnerability, updates to threat playbooks with adjusted/changed responses to known vulnerabilities, updated contact lists, and/or any other suitable notifications corresponding to cyber threat intelligence. The notifications displayed in the notification section 622 may also include graphical indications displayed in tandem with the textual notification to indicate a degree or type of threat or other quality of the associated notification. This notification section 622 may also be interactive, such that a participant may interact with (e.g., click, tap, swipe, voice command, gesture, etc.) the section 622, and may expand or otherwise receive additional information corresponding to any notification included in the notification section 622.

As another example, the platform GUI 620 includes a threat intelligence section 624. The intelligence content/feed included in this threat intelligence section 624 may be or include updates to incident response plans (e.g., threat playbooks), a degree or quality of a threat, how the threat may impact participant systems, contact lists for a particular threat, and/or any other suitable information or combinations thereof. The intelligence displayed in the threat intelligence section 624 may also include graphical indications displayed in tandem with the textual intelligence feed to quickly indicate a quality and/or application of the associated intelligence feed. This threat intelligence section 624 may also be interactive, such that a participant may interact with (e.g., click, tap, swipe, voice command, gesture, etc.) the section 624, and may expand or otherwise receive additional information corresponding to any intelligence feed included in the threat intelligence section 624.

As yet another example, the platform GUI 620 includes a smart contracts display section 626, which may include graphical indications representing some/all of the various smart contracts (and their underlying functions), for use by a participant. As illustrated in FIG. 6C, the smart contracts display section 626 may include, for example, a broadcast object, a transactions object, a file search object, a training object, a node search object, a contact search object, a chain metrics object, and a share file object. Each of these objects in the smart contracts display section 626 may be interactive, such that a participant may interact with (e.g., click, tap, swipe, voice command, gesture, etc.) the objects, and may expand or otherwise receive additional information corresponding to and/or execute any smart contracts included in the smart contracts display section 626.

The broadcast object may enable a participant to transmit notifications to other participants on the platform, for example, using a unicast, multi-cast, and/or a broadcast mechanism. The transactions object may enable a participant to view everywhere that the participant has contributed to the distributed ledger and why the participant has a respective level of access/voting power. The file search object may enable a participant to search for content stored and/or otherwise accessible from the platform, such as an incident response playbook, and to download and/or otherwise access the content. The training object may enable a participant to train themselves or others regarding use of the platform, such as how to configure the interface, how to view/retrieve content lists on the distributed ledger, how to submit documents to the distributed ledger, what/how the trained AI/ML model(s) may interpret/analyze uploaded documents, etc. The node search object may enable a participant to perform clearance with respect to other nodes (e.g., nefarious nodes) on the platform by, for example, causing the trained AI/ML model to transmit a broadcast to all participant nodes (excluding the nefarious node) polling the nodes to potentially vote the nefarious node(s) out of the chain/platform. The contract search object may enable participants to view what smart contracts exist on the distributed ledger (e.g., as part of the smart contracts engine 1004) and/or to monitor the code being executed on the distributed ledger, and thereby potentially identify nefarious transactions taking place. The chain metrics object may enable participants to analyze and/or otherwise view various metrics associated with the transactions taking place on the distributed ledger, as described herein. The share file object may enable participants to intentionally share content stored and/or otherwise accessible from the platform to another participant.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '______' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A system for providing a distributed cyber threat intelligence platform, the system comprising:

one or more memories storing computer-executable instructions including a set of cyber threat intelligence content stored on a distributed ledger accessible by one or more nodes, an artificial intelligence (AI) engine, and a smart contracts engine; and one or more processors communicatively coupled with the one or more memories that are configured to execute the computer-executable instructions and cause the system to:

execute the AI engine to:

receive a node input from a new device indicating a node type to be established for the new device, generate, by a trained AI model, one or more responses to the node input corresponding to an advantage or a disadvantage of the node type, and after generating the one or more responses, establish, by the trained AI model, a new node for the new device on the distributed ledger that corresponds to the node type; and execute the smart contracts engine to:

receive, from the new node, a second input associated with cyber threat intelligence, store, by a first smart contract, the second input in the distributed ledger as part of the set of cyber threat intelligence content, and transmit, by a second smart contract, the second input to the one or more nodes.

2. The system of claim 1, wherein the AI engine is further configured to:

evaluate, by the trained AI model, the second input received from the new node;

generate, by the trained AI model, composite cyber threat content by combining portions of the second input and one or more inputs previously stored on the distributed ledger as part of the set of cyber threat intelligence content; and disseminate the composite cyber threat content to each of the one or more nodes.

3. The system of claim 1, wherein the trained AI model comprises a large language model (LLM) trained using a plurality of training node inputs and a plurality of training distributed ledger inputs to output training responses, node types, and threat evaluations.

4. The system of claim 1, further comprising a reward engine configured to:

determine that a first node of the one or more nodes has satisfied a reward threshold;

generate a non-fungible token (NFT) based on the reward threshold; and mint the NFT to the distributed ledger, wherein a portion of data associated with the reward threshold is linked to the NFT.

5. The system of claim 4, wherein the reward threshold corresponds to at least one of: (i) a contribution threshold, (ii) a bug discovery threshold, or (iii) a suggestion threshold, and the reward engine is further configured to:

evaluate a contribution level of the first node to determine whether the first node has satisfied the contribution threshold;

evaluate a bug discovery value of the first node to determine whether the first node has satisfied the bug discovery threshold; or evaluate one or more suggestions contributed by the first node to determine whether the first node has satisfied the suggestion threshold.

6. The system of claim 1, wherein the smart contracts engine comprises at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

7. The system of claim 1, wherein each node of the one or more nodes includes a clearance level value, and the smart contracts engine is configured to:

receive, from the AI engine, an indication of a potentially compromised node of the one or more nodes;

transmit a polling prompt to each node of the one or more nodes without transmitting the polling prompt to the potentially compromised node;

receive a poll response from each node; and responsive to receiving the poll response from each node, isolate the potentially compromised node from participating on the distributed ledger by adjusting the clearance level value of the potentially compromised node.

8. The system of claim 1, wherein the AI engine is further configured to:

receive, from the new node, an indication of the second input associated with cyber threat intelligence;

evaluate a proof-of-contribution for the new node based on the indication; and allocate an increased level of voting power to the new node, in accordance with the proof-of-contribution.

9. The system of claim 1, wherein the first smart contract is identical to the second smart contract.

10. The system of claim 1, wherein the set of cyber threat intelligence content comprises at least one of: (i) a threat vulnerability notification, (ii) a reference architecture, (iii) a threat response procedure, (iv) a set of contacts, (v) a vendor indication, (vi) a policy configuration, (vii) an education resource, or (viii) a threat intelligence communication.

11. A computer-implemented method for providing a distributed cyber threat intelligence platform, the computer-implemented method comprising:

receiving, at one or more processors executing an artificial intelligence (AI) engine, a node input from a new device indicating a node type to be established for the new device on a distributed ledger;

generating, by the one or more processors executing a trained AI model of the AI engine, one or more responses to the node input corresponding to an advantage or a disadvantage of the node type;

after generating the one or more responses, establishing, by the one or more processors executing the trained AI model, a new node for the new device on the distributed ledger that corresponds to the node type;

receiving, at the one or more processors executing a smart contracts engine, a second input associated with cyber threat intelligence;

storing, by the one or more processors executing a first smart contract of the smart contracts engine, the second input in the distributed ledger as part of a set of cyber threat intelligence content; and transmitting, by the one or more processors executing a second smart contract of the smart contracts engine, the second input to one or more nodes having access to the distributed ledger.

12. The computer-implemented method of claim 11, further comprising:

evaluating, by the one or more processors executing the trained AI model, the second input received from the new node;

generating, by the one or more processors executing the trained AI model, composite cyber threat content by combining portions of the second input and one or more inputs previously stored on the distributed ledger as part of the set of cyber threat intelligence content; and disseminating, by the one or more processors, the composite cyber threat content to each of the one or more nodes.

13. The computer-implemented method of claim 12, wherein the disseminating of the composite cyber threat content is performed anonymously.

14. The computer-implemented method of claim 11, wherein the trained AI model comprises a large language model (LLM) trained using a plurality of training node inputs and a plurality of training distributed ledger inputs to output training responses, node types, and threat evaluations.

15. The computer-implemented method of claim 11, further comprising:

determining, by the one or more processors executing a reward engine, that a first node of the one or more nodes has satisfied a reward threshold corresponding to at least one of: (i) a contribution threshold, (ii) a bug discovery threshold, or (iii) a suggestion threshold by:

evaluating a contribution level of the first node to determine whether the first node has satisfied the contribution threshold, evaluating a bug discovery value of the first node to determine whether the first node has satisfied the bug discovery threshold, or evaluating one or more suggestions contributed by the first node to determine whether the first node has satisfied the suggestion threshold;

generating, by the one or more processors executing the reward engine, a non-fungible token (NFT) based on the reward threshold; and minting, by the one or more processors executing the reward engine, the NFT to the distributed ledger, wherein a portion of data associated with the reward threshold is linked to the NFT.

16. The computer-implemented method of claim 11, wherein the smart contracts engine comprises at least one of: (a) an asset control contract, (b) a content orchestration contract, (c) a compromise contract, (d) a contact and escalation contract, (e) a broadcast contract, (f) a clearance level contract, (g) a contribution and voting score assignment contract, (h) a contact maintenance contract, (i) an SIEM logging integration contract, (j) a network security and operational monitoring contract, or (k) an AI governance and enforcement contract.

17. The computer-implemented method of claim 11, wherein each node of the one or more nodes includes a clearance level value, and the computer-implemented method further comprises:

receiving, at the one or more processors executing the AI engine, an indication of a potentially compromised node of the one or more nodes;

transmitting, by the one or more processors executing the smart contracts engine, a polling prompt to each node of the one or more nodes without transmitting the polling prompt to the potentially compromised node;

receiving, at the one or more processors executing the smart contracts engine, a poll response from each node; and responsive to receiving the poll response from each node, isolating, by the one or more processors executing the smart contracts engine, the potentially compromised node from participating on the distributed ledger by adjusting the clearance level value of the potentially compromised node.

18. The computer-implemented method of claim 11, further comprising:

receiving, at the one or more processors from the new node, an indication of the second input associated with cyber threat intelligence;

evaluating, by the one or more processors executing the AI engine, a proof-of-contribution for the new node based on the indication; and allocating, by the one or more processors executing the AI engine, an increased level of voting power to the new node, in accordance with the proof-of-contribution.

19. The computer-implemented method of claim 11, wherein the set of cyber threat intelligence content comprises at least one of: (i) a threat vulnerability notification, (ii) a reference architecture, (iii) a threat response procedure, (iv) a set of contacts, (v) a vendor indication, (vi) a policy configuration, (vii) an education resource, or (viii) a threat intelligence communication.

20. A tangible, non-transitory computer-readable medium storing instructions for providing a distributed cyber threat intelligence platform that, when executed by one or more processors of a computing device, cause the computing device to:

receive, at an artificial intelligence (AI) engine, a node input from a new device indicating a node type to be established for the new device on a distributed ledger;

generate, by a trained AI model of the AI engine, one or more responses to the node input corresponding to an advantage or a disadvantage of the node type;

after generating the one or more responses, establish, by the trained AI model, a new node for the new device on the distributed ledger that corresponds to the node type;

receive, from the new node at a smart contracts engine, a second input associated with cyber threat intelligence;

store, by a first smart contract of the smart contracts engine, the second input in the distributed ledger as part of a set of cyber threat intelligence content; and transmit, by a second smart contract of the smart contracts engine, the second input to one or more nodes having access to the distributed ledger.

* * * * *